(12) United States Patent
Honda et al.

(10) Patent No.: US 11,095,372 B2
(45) Date of Patent: Aug. 17, 2021

(54) OPTICAL COMMUNICATION APPARATUS, WAVELENGTH CALIBRATION METHOD, AND PROGRAM

(71) Applicant: Nippon Telegraph and Telephone Corporation, Tokyo (JP)

(72) Inventors: Kazuaki Honda, Musashino (JP); Hirotaka Nakamura, Musashino (JP); Jun Terada, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 16/970,284

(22) PCT Filed: Feb. 21, 2019

(86) PCT No.: PCT/JP2019/006565
§ 371 (c)(1),
(2) Date: Aug. 14, 2020

(87) PCT Pub. No.: WO2019/167797
PCT Pub. Date: Sep. 6, 2019

(65) Prior Publication Data
US 2021/0083778 A1 Mar. 18, 2021

(30) Foreign Application Priority Data
Mar. 2, 2018 (JP) .............................. JP2018-038073

(51) Int. Cl.
*H04J 14/02* (2006.01)
*H04B 10/572* (2013.01)
(Continued)

(52) U.S. Cl.
CPC ..... *H04B 10/572* (2013.01); *H04B 10/07957* (2013.01); *H04B 10/272* (2013.01); *H04B 10/506* (2013.01)

(58) Field of Classification Search
CPC ............ H04B 10/572; H04B 10/07957; H04B 10/272; H04B 10/506; H04B 10/564;
(Continued)

(56) References Cited

U.S. PATENT DOCUMENTS

2016/0226618 A1* 8/2016 Lee ...................... H04B 10/572
2017/0054504 A1* 2/2017 Poehlmann .......... H04B 10/572

FOREIGN PATENT DOCUMENTS

| JP | A-2000-068982 | 3/2000 |
| JP | A-2012-510758 | 5/2012 |

(Continued)

OTHER PUBLICATIONS

Pachnicke et al., "First Demonstration of a Full C-Band Tunable WDM-PON System with Novel High-Temperature DS-DBR Lasers," *Optical Society of America*, 2014, 3 pages.

(Continued)

*Primary Examiner* — Hibret A Woldekidan
(74) *Attorney, Agent, or Firm* — Fish & Richardson P.C.

(57) ABSTRACT

An OLT (2) includes one or more optical receivers (22) configured to receive optical signals of respective different wavelengths obtained by an AWG filter (4) demultiplexing a wavelength-multiplexed signal addressed to the terminal itself, and a supervisory controller (23) configured to transmit, to an ONU (3), a wavelength adjustment instruction to transit a wavelength to be used by an optical transmitter (32) for transmission of an optical signal, to set a difference between an optical received power of an optical signal received by any of the optical receivers (22) and a reference value of the optical received power within a threshold, the ONU (3) being a transmission source of the optical signal.

8 Claims, 11 Drawing Sheets

(51) Int. Cl.
*H04B 10/079* (2013.01)
*H04B 10/272* (2013.01)
*H04B 10/50* (2013.01)

(58) Field of Classification Search
CPC .............. H04B 10/675; H04B 10/0799; H04B 10/0795; H04J 14/02; H04J 14/0221
USPC ... 398/79, 94, 95, 66, 67, 70, 71, 72, 38, 25
See application file for complete search history.

(56) References Cited

FOREIGN PATENT DOCUMENTS

| | | | |
|---|---|---|---|
| JP | 2017011379 | * | 1/2017 |
| JP | A-2017-011379 | | 1/2017 |
| JP | A-2017-511655 | | 4/2017 |
| WO | WO 2010/064981 | | 6/2010 |
| WO | WO 2015/150028 | | 10/2015 |

OTHER PUBLICATIONS

PCT International Search Report in International Appln. No. PCT/JP2019/006565, dated Apr. 5, 2019, 3 pages (with English Translation).

* cited by examiner

OPTICAL COMMUNICATION APPARATUS, WAVELENGTH CALIBRATION METHOD, AND PROGRAM

CROSS-REFERENCE TO RELATED APPLICATIONS

This application is a National Stage application under 35 U.S.C. § 371 of International Application No. PCT/JP2019/006565, having an International Filing Date of Feb. 21, 2019, which claims priority to Japanese Application Serial No. 2018-038073, filed on Mar. 2, 2018. The disclosure of the prior application is considered part of the disclosure of this application, and is incorporated in its entirety into this application.

TECHNICAL FIELD

The present invention relates to an optical communication apparatus, a wavelength calibration method, and a program.

BACKGROUND ART

To achieve further advancements in the future of passive optical network (PON) systems being introduced as optical access systems that provide fiber to the home (FTTH) service to meet rapidly increasing traffic demand, wavelength division multiplexing (WDM)-PON and WDM/Time division multiplexing (WDM/TDM)-PON systems are currently discussed.

In current FTTH, gigabit-Ethernet (trade name) passive optical network (1G-EPON) that is a type of TDM-PON system, is employed. Employing WDM-PON systems and WDM/TDM-PON systems that perform multiplexing on the wavelength axis, in contrast, has a possibility of achieving a further increase in transmission capacity.

In a PON that performs wavelength-multiplexing, such as a WDM-PON or a WDM/TDM-PON, a technique has been used in which a wavelength-variable laser is mounted in an optical network unit (ONU) (an optical subscribe line network apparatus) for unification of the kind, to consequently simplify wavelength management in the ONU (for example, refer to NPL1). However, in an optical transceiver mounted in an ONU, a wavelength-variable laser causes a wavelength shift due to a shift in wavelength of an initial configuration or due to aging. When a wavelength shift occurs, a deviation from a center wavelength of the transmittance of a wavelength multiplexing/demultiplexing filter occurs, to consequently decrease an optical received power of a main signal, and cause a communication breakdown and a main signal communication breakdown of adjacent wavelengths due to generation of crosstalk in adjacent transmission channels. To address this, a function of detecting a wavelength shift and performing calibration is needed.

FIG. 11 is a diagram illustrating an optical communication system 91 using a known technique. In the optical communication system 91, one optical line terminal (OLT) (optical subscriber line termination apparatus) 92 and a plurality of ONUs 93 are connected via a wavelength multiplexer/demultiplexer (wavelength multiplexing/demultiplexing filter) 94, a power monitor optical branching device 95, an optical power splitter 96, and optical fibers 97 and 98. The OLT 92 is an accommodation-station-side apparatus, and the ONUs 93 are user-side apparatuses. The direction from each of the ONUs 93 to the OLT 92 is described as "uplink", and the direction from the OLT 92 to each of the ONUs 93 is described as "downlink".

The OLT 92 is provided with the same number of optical transceivers (Txs and Rxs) as that of the ONUs 93. The optical transceivers of the OLT 92 perform communication using different uplink wavelengths/downlink wavelengths assigned to the respective ONUs 93. The transmitter (Tx) in the optical transceiver in each of the ONUs 93 is equipped with a wavelength-variable light source, such as a temperature-controlled semiconductor laser, a current-controlled semiconductor laser, or an external resonant type laser. A power monitor circuit 99 is equipped with a narrow line width wavelength multiplexer/demultiplexer, such as an etalon filter, to monitor the powers of uplink signals, and the same number of optical receivers as that of the ONUs 93.

The optical power splitter 96 performs wavelength-multiplexing on optical signals transmitted from the respective ONUs 93 and having different uplink wavelengths. The power monitor optical branching device 95 branches the power of a part of the entire wavelength of a wavelength-multiplexed uplink signal and transmits a resultant power to the power monitor circuit 99. Since the transmission line width of the narrow line width wavelength multiplexer/demultiplexer included in the power monitor circuit 99 is small, the power after transmission is abruptly decreased when the wavelength is shifted. The decrease amount is detected by the optical receiver for a corresponding wavelength in the power monitor circuit 99 and is reported to the OLT 92. A supervisory controller in the OLT 92 instructs the ONU 93 corresponding to the wavelength shift, to change the uplink wavelength toward a long wavelength side or a short wavelength side. The supervisory controller of each ONU 93 controls the wavelength-variable light source in the transmitter in accordance with the instruction and changes the uplink wavelength accordingly. The power monitor circuit 99 detects the power at each moment, and the OLT 92 continues to instruct the ONU 93 so that the power would be maximized.

CITATION LIST

Non Patent Literature

NPL1: S. Pachnicke and 11 others, "First Demonstration of a Full C-Band Tunable WDM-PON System with Novel High-Temperature DS-DBR Lasers", in proc. of OFC2014, paper W3G.2, March 2014

SUMMARY OF THE INVENTION

Technical Problem

However, in the known technique, a power monitor circuit including an expensive narrow line width wavelength multiplexer/demultiplexer and power monitor optical receivers as many as ONUs is needed, and this causes the structure to be complexed. Moreover, since a wavelength shift is converted to a power for monitoring, a decrease in transmission power of the wavelength-variable light source itself is incorrectly recognized as a wavelength shift, and an algorithm for wavelength calibration continues operating without any warning being given, to consequently take long before a failure is detected, in some cases.

In light of the foregoing, an object of the present invention is to provide an optical communication apparatus, a wavelength calibration method, and a program that enable calibration of a wavelength shift in an optical transmitter in an apparatus that transmits an optical signal to be wavelength-multiplexed, with a simple configuration.

Means for Solving the Problem

One aspect of the present invention is an optical communication apparatus including: one or more optical receivers configured to receive optical signals of different wavelengths obtained by a wavelength demultiplexer demultiplexing a wavelength-multiplexed signal addressed to the optical communication apparatus itself; and a supervisory controller configured to transmit, to a transmission source apparatus, a wavelength adjustment instruction to transit a wavelength to be used by an optical transmitter for transmission of an optical signal, to set a difference between an optical received power and a reference value of the optical received power within a threshold, the transmission source apparatus being another optical communication apparatus which is a transmission source of the optical signal, the optical received power being a power of the optical signal received by any of the optical receivers.

One aspect of the present invention is the above-described optical communication apparatus, wherein, the supervisory controller receives a report of an optical transmission power in the optical transmitter from the transmission source apparatus, and detects an abnormality of the optical transmitter, based on a comparison between the optical transmission power thus reported and an initial value of the optical transmission power in the optical transmitter.

One aspect of the present invention is the above-described optical communication apparatus, wherein, in a case of determining that the difference between the optical received power of the optical signal received by the optical receiver and the reference value is equal to or greater than the threshold, the supervisory controller instructs the transmission source apparatus to report the optical transmission power in the optical transmitter, and determines that an abnormality of the optical transmitter has occurred, when the optical transmission power reported from the transmission source apparatus in response to the instruction is decreased from the initial value by a predetermined value or more, and determines that a wavelength shift has occurred in the optical transmitter, when a decrease from the initial value is within the predetermined value.

One aspect of the present invention is the above-described optical communication apparatus, wherein, the wavelength demultiplexer is a filter with a Gaussian transmittance, and the supervisory controller transmits the wavelength adjustment instruction to the transmission source apparatus when the difference between the optical received power of the optical signal received by the optical receiver and the reference value is equal to or greater than the threshold, and transmits, to the transmission source apparatus, a wavelength adjustment instruction to transit a wavelength, with reference to a direction of a wavelength shift determined based on a comparison between optical received powers before and after the wavelength adjustment instruction is transmitted.

One aspect of the present invention is the above-described optical communication apparatus, wherein, the wavelength demultiplexer is a filter with a Gaussian transmittance, and the supervisory controller transmits, to the transmission source apparatus, the wavelength adjustment instruction to transit a wavelength by a certain amount, when the difference between the optical received power of the optical signal received by the optical receiver and the reference value is equal to or greater than the threshold, instructs the transmission source apparatus to report the optical transmission power in the optical transmitter when the difference does not fall within the threshold even after the wavelength adjustment instruction is repeatedly transmitted a predetermined number of times, and determines that an abnormality in the optical transmitter or another failure has occurred, based on a comparison between an optical transmission power reported from the transmission source apparatus in response to the instruction and the initial value.

One aspect of the present invention is the above-described optical communication apparatus, wherein, the wavelength demultiplexer is a filter with a flat-top transmittance, and the supervisory controller repeatedly transmits, to the transmission source apparatus, a wavelength adjustment instruction to transit a wavelength to be used by the optical transmitter for transmission of an optical signal, to a long wavelength side and a short wavelength side within a predetermined range, and determines that a wavelength shift has occurred in the optical transmitter when a difference between an optical received power of an optical signal received by the optical receiver after the wavelength adjustment instruction is transmitted and the reference value is equal to or greater than the threshold.

One aspect of the present invention is a wavelength calibration method performed by an optical communication apparatus, the wavelength calibration method including: receiving, by one or more optical receivers, optical signals of different wavelengths obtained by a wavelength demultiplexer demultiplexing a wavelength-multiplexed signal addressed to the optical communication apparatus itself; and transmitting, to a transmission source apparatus, a wavelength adjustment instruction to transit a wavelength to be used by an optical transmitter for transmission of an optical signal, to set a difference between an optical received power and a reference value of the optical received power within a threshold, the transmission source apparatus being another optical communication apparatus which is a transmission source of the optical signal, the optical received power being a power of the optical signal received by any of the optical receivers.

One aspect of the present invention is a program for causing a computer to be used for an optical communication apparatus including one or more optical receivers configured to receive optical signals of different wavelengths obtained by a wavelength demultiplexer demultiplexing a wavelength-multiplexed signal addressed to the optical communication apparatus itself, to execute transmitting, to a transmission source apparatus, a wavelength adjustment instruction to transit a wavelength to be used by an optical transmitter for transmission of an optical signal, to set a difference between an optical received power and a reference value of the optical received power within a threshold, the transmission source apparatus being another optical communication apparatus which is a transmission source of the optical signal, the optical received power being a power of the optical signal received by any of the optical receivers.

Effects of the Invention

According to the present invention, it is possible, with a simple configuration, to calibrate a wavelength shift in an optical transmitter in an apparatus that transmits an optical signal to be wavelength-multiplexed.

DESCRIPTION OF EMBODIMENTS

Embodiments of the present invention will be described in detail with reference to the drawings.

First Embodiment

Figure 1:
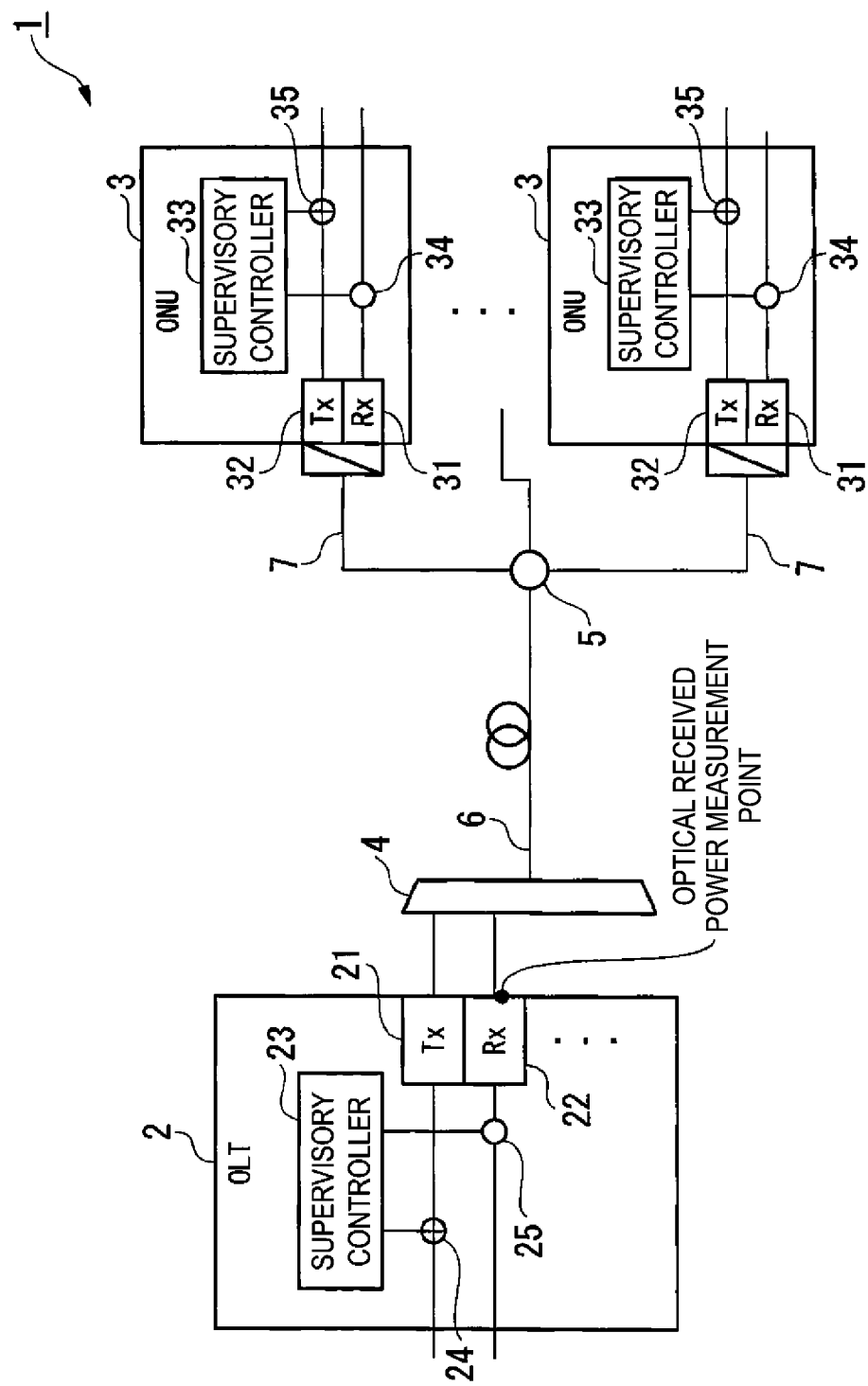
FIG. 1 is a diagram illustrating a configuration of an optical access system according to a first embodiment of the present invention.

FIG. 1 is a diagram illustrating a configuration of an optical access system 1 according to a first embodiment of the present invention. The optical access system 1 is a wavelength multiplexed PON system, such as a WDM-PON system. The optical access system 1 includes one OLT 2, N (where N is an integer of one or greater) ONUs 3, an arrayed waveguide grating (AWG) filter 4, and an optical power splitter 5. The OLT 2 and the ONU(s) 3 are examples of optical communication apparatuses. The AWG filter 4 and the optical power splitter 5 are connected via an optical fiber 6. The optical power splitter 5 and each ONU 3 are connected via an optical fiber 7. For example, the optical access system 1 relays communication between an apparatus connected on a lower-layer side of each ONU 3 and an apparatus connected on a higher-layer side of the OLT 2. The direction from each ONU 3 to the OLT 2 is described as "uplink", and the direction from the OLT 2 to each ONU 3 is described as "downlink".

The OLT 2 includes one or more optical transmitters (Txs) 21, one or more optical receivers (Rxs) 22, a supervisory controller 23, a control signal superimposing unit 24, and a control signal extracting unit 25. The OLT 2 includes at least a set(s) of the optical transmitter 21 and the optical receiver 22, the number of sets being equal to the number of the ONUs 3 communicating concurrently with the OLT 2. The sets of the optical transmitter 21 and the optical receiver 22 communicate with the different ONUs 3 by using different downlink wavelengths and different uplink wavelengths. In other words, the plurality of optical transmitters 21 transmit downlink signals of different wavelengths, and the plurality of optical receivers 22 receive uplink signals of different wavelengths. Each optical transmitter 21 converts a downlink signal addressed to the corresponding ONU 3, which is an electric signal, into an optical signal and outputs the optical signal to the AWG filter 4. Each optical receiver 22 receives an uplink signal transmitted from the corresponding ONU 3 through the AWG filter 4, converts the uplink signal, which is an optical signal, into an electric signal, and outputs the electric signal. The supervisory controller 23 monitors the power of each uplink optical signal received by each optical receiver 22 (hereinafter referred to as an "optical received power"). In a case of detecting a decrease in optical received power, the supervisory controller 23 instructs the corresponding ONU 3 to adjust the wavelength of an uplink signal. The control signal superimposing unit 24 superimposes a supervisory control signal addressed to the corresponding ONU 3 on the downlink electric signal input to the corresponding optical transmitter 21, in accordance with control by the supervisory controller 23. The control signal extracting unit 25 extracts the supervisory control signal from the uplink signal, which is an electric signal, converted by the optical receiver 22 from an optical signal, and outputs the supervisory control signal to the supervisory controller 23.

Each ONU 3 includes an optical receiver (Rx) 31, an optical transmitter (Tx) 32, a supervisory controller 33, a control signal extracting unit 34, and a control signal superimposing unit 35. The optical receiver 31 receives a downlink optical signal transmitted from the OLT 2, converts the optical signal into an electric signal, and outputs the electric signal. The optical transmitter 32 converts an uplink signal addressed to the OLT 2, which is an electric signal, into an optical signal and transmits the optical signal. The optical transmitter 32 is equipped with a wavelength-variable light source, such as a temperature controlled semiconductor laser, a current controlled semiconductor laser, or an external resonant type laser. The supervisory controller 33 controls the wavelength of an optical signal transmitted from the optical transmitter 32, in accordance with an instruction from the OLT 2. The supervisory controller 33 reports, to the OLT 2, an optical transmission power, which is the power of the optical signal transmitted from the optical transmitter 32. The control signal extracting unit 34 extracts a supervisory control signal from a downlink signal, which is an electric signal converted by the optical receiver 31 from an optical signal, and outputs the supervisory control signal to the supervisory controller 33. The control signal superimposing unit 35 superimposes the supervisory control signal on an uplink electric signal input to the optical transmitter 32, in accordance with control by the supervisory controller 33.

The AWG filter 4 is used as a multiplexer/demultiplexer. The AWG filter 4 multiplexes downlink optical signals of different wavelengths output from the plurality of optical transmitters 21 of the OLT 2, and inputs the resultant signal to the optical fiber 6. The optical power splitter 5 splits the downlink optical signal transmitted via the optical fiber 6 and transmits the resultant signals to the respective ONUs 3. The optical power splitter 5 also multiplexes uplink optical signals received via the optical fibers 7 and transmits the resultant signal to the optical fiber 6. The AWG filter 4 demultiplexes the uplink optical signals transmitted via the optical fiber 6 and inputs the resultant signals to the respective optical receivers 22 of the OLT 2. Note that the AWG filter 4 may be provided in the OLT 2.

Figure 2:
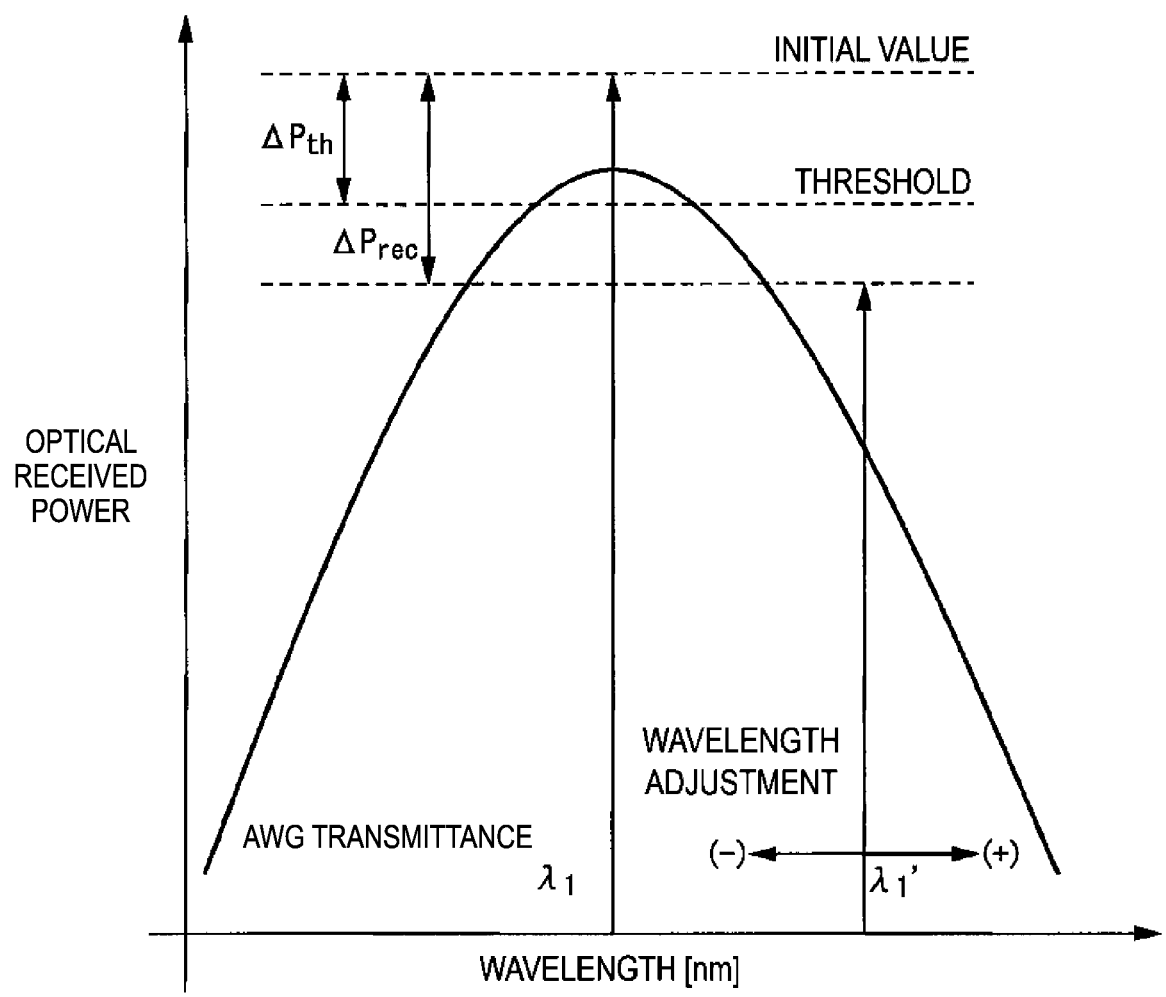
FIG. 2 is a diagram illustrating transmittance of an AWG filter according to the embodiment.

FIG. 2 is a diagram illustrating transmittance of the AWG filter 4. FIG. 2 illustrates an optical received power in one of the optical receivers 22 in the OLT 2 after transmission through the AWG filter 4. The AWG filter 4 includes a plurality of emission waveguides having different transmission wavelengths, and FIG. 2 illustrates an output from one of the emission waveguides. The center wavelength of the Gaussian transmittance (the wavelength having the smallest attenuation amount) illustrated in FIG. 2 is referred to as a wavelength $\lambda_1$. It can be seen from FIG. 2 that, when the wavelength of an optical signal transmitted from the ONU 3 is shifted from the wavelength $\lambda_1$ to a wavelength $\lambda_1'$, the optical power transmitted through the AWG filter 4 decreases. When detecting a decrease in optical power of an uplink signal, the OLT 2 instructs the ONU 3 to shift (transit) the wavelength of an optical signal to be transmitted from the optical transmitter 32 to a short wavelength side (−) or a long wavelength side (+), for adjustment so that the uplink wavelength would come closer to $\lambda_1$.

Operations of the optical access system 1 will be described next.

The OLT 2 and each ONU 3 transmit and receive supervisory control signals. An example of a method of establishing a supervisory control channel for transmitting and receiving a supervisory control signal is an In-band method of encapsulating a control frame of a main signal by using Ethernet (trade name) or the like or using a preliminary region. In addition to this, as defined as an auxiliary management and control channel (AMCC) in the ITU-T G.989 series, communication may be performed in an Out-of-band method in which a physically different supervisory control channel is established for a main signal. In this way, the OLT 2 and each ONU 3 are capable of superimposing a supervisory control signal on a main signal, and transmitting and receiving the resultant signal.

When a new ONU 3 is connected to the optical access system 1 (PON system), an initial connection operation, such as wavelength assignment or ONU registration, is performed between the OLT 2 and the ONU 3. In this operation, a monitor photo diode (PD) mounted in the corresponding optical receiver 22 included in the OLT 2 measures the optical received power after transmission through the AWG filter 4. The supervisory controller 23 of the OLT 2 instructs the ONU 3 to report an optical transmission power, via the supervisory control channel. In response to this instruction, the supervisory controller 33 of the ONU 3 measures an optical transmission power by using an optical transmission power monitor function provided in the optical transmitter 32, and reports the optical transmission power to the OLT 2 via the supervisory control channel. The supervisory controller 23 of the OLT 2 stores these two optical powers as initial values in a storage unit (not illustrated) provided inside or outside the supervisory controller 23. The initial value of the optical received power serves as a reference value of an optical received power to be used for detection of a decrease in optical received power, and the initial value of the optical transmission power serves as a reference value of an optical transmission power to be used for detection of an abnormality in optical transmission power.

Figure 3:
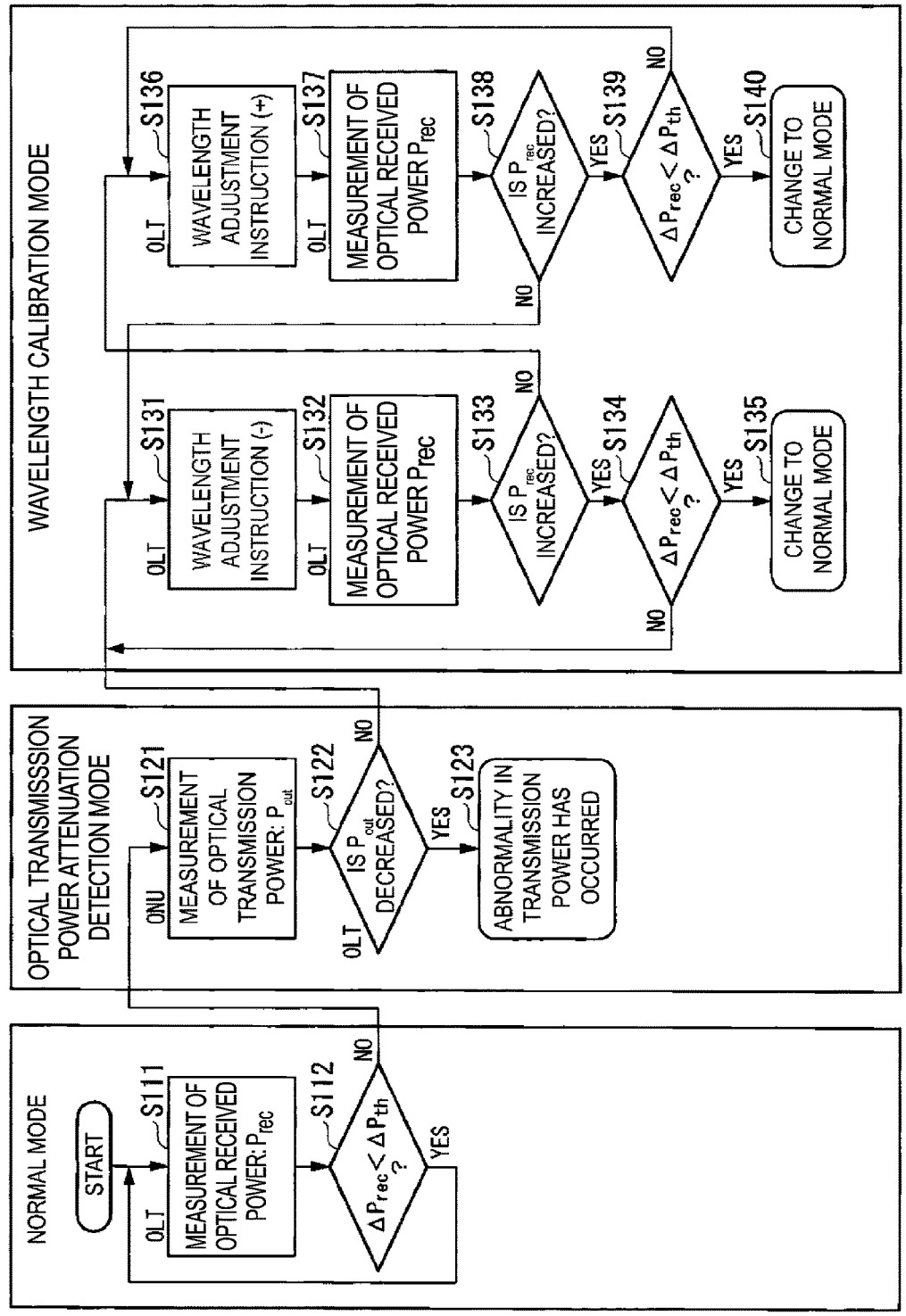
FIG. 3 is a flowchart illustrating a wavelength calibration process of the optical access system according to the embodiment.

FIG. 3 is a flowchart illustrating a wavelength calibration process of the optical access system 1. For each ONU 3, the optical access system 1 enters a normal mode after completing the above initial connection and performs wavelength calibration in a wavelength calibration flowchart illustrated in FIG. 3.

In the normal mode, the supervisory controller 23 of the OLT 2 uses the monitor PD mounted in the optical receiver 22 to measure an optical received power $P_{rec}$ of an uplink optical signal at an interval predetermined by a telecommunications carrier (step S111). The uplink optical signal to be measured is a main signal. The supervisory controller 23 determines whether or not a change amount $\Delta P_{rec}$ from the initial value of the optical received power $P_{rec}$ thus measured is less than a threshold $\Delta P_{th}$ (step S112). In a case where the supervisory controller 23 determines that the change amount $\Delta P_{rec}$ is less than the threshold (step S112: YES), the supervisory controller 23 continues being in the normal mode and repeats the processing from step S111. In a case where the supervisory controller 23 determines that the change amount $\Delta P_{rec}$ is equal to or greater than the threshold $\Delta P_{th}$ (step S112: NO), the supervisory controller 23 changes to an optical transmission power attenuation detection mode.

Note that, as a reference value of the optical received power, a reference value that is updated at a timing specified by an operator or in a certain cycle may be used instead of the above-described initial value of the optical received power. Alternatively, the threshold $\Delta P_{th}$ may be updated at the tuning specified by the operator or in a certain cycle. This may correspond, for example, to application to a case of considering slight attenuation of an optical output power in a long time period as a margin of the system.

In the optical transmission power attenuation detection mode, the supervisory controller 23 of the OLT 2 instructs the ONU 3 to report an optical transmission power, by using a supervisory control signal. The supervisory controller 33 of the ONU 3 measures an optical transmission power $P_{out}$ in the optical transmitter 32 at the time of receiving the instruction and reports the optical transmission power $P_{out}$ to the OLT 2 by using the supervisory control signal (step S121). When receiving the report, the supervisory controller 23 of the OLT 2 checks whether or not the reported optical transmission power $P_{out}$ is decreased from the initial value by a predetermined value or more (step S122). The predetermined value is a value equal to or greater than zero with which it is possible to determine that the optical transmission power $P_{out}$ is not substantially changed from the initial value. In a case where the supervisory controller 23 confirms a decrease (step S122: YES), the supervisory controller 23 provides an alarm indicating an abnormality in transmission power, as a report to the operator (step S123). Conceivable factors of this include a failure of any member in a laser diode (LD) or a thermoelectric cooler (TEC) due to aging or physical damage and an abnormality in bias current value to any member. In a case where no decrease in optical transmission power is confirmed, this means that only the optical received power is decreased, and it can be consequently detected that a wavelength shift has occurred. In a case where the supervisory controller 23 determines that the optical transmission power $P_{out}$ is not decreased from the initial value by the predetermined value or more (step S122: NO), the supervisory controller 23 changes to a wavelength calibration mode. FIG. 2 illustrates a relationship between the change amount $\Delta P_{rec}$ at the time when the uplink wavelength is shifted to $\lambda_i'$ and the wavelength configuration mode is started and the threshold $\Delta P_{th}$.

In the wavelength calibration mode, the supervisory controller 23 of the OLT 2 transmits a wavelength adjustment instruction by using a supervisory control signal to the ONU 3 (step S131). An example of the instruction in step S131 is to "shift the wavelength by 5 GHz toward the short wavelength side". The wavelength width for the shift is a value determined in advance based on the characteristics of the filter and the wavelength transition accuracy of the wavelength-variable optical transceiver. The supervisory controller 33 of the ONU 3 changes the wavelength configured in the optical transmitter 32 toward the short wavelength side, in accordance with the wavelength adjustment instruction. Note that the wavelength may be shifted toward the long wavelength side first. The amount of shift may be a certain amount or may be varied in a random or periodic manner. The supervisory controller 23 of the OLT 2 thereafter measures the optical received power $P_{rec}$ again after waiting for a time period for the wavelength transition or after receiving a report of completion of the wavelength transition from the ONU 3 (step S132).

The supervisory controller 23 determines whether or not the optical received power P measured in step S132 is increased from that in the previous measurement (step S133). In a case where the optical received power $P_{rec}$ is increased (step S133: YES), this allows the supervisory controller 23 to determine that the wavelength is successfully moved in a direction of coming closer to the center wavelength of the Gaussian transmittance of the AWG filter 4. After that, the supervisory controller 23 determines whether or not the change amount $\Delta P_{rec}$ of the optical received power $P_{rec}$ measured in step S132 from the initial value is less than the threshold $\Delta P_{th}$ (step S134). In a case where the supervisory controller 23 determines that the change amount $\Delta P_{rec}$ is less than the threshold $\Delta P_{th}$ (step S134: YES), the supervisory controller 23 terminates the wavelength calibration mode and changes to the normal mode (step S135). In a case where the supervisory controller 23 determines that the change amount $\Delta P_{rec}$ is equal to or greater than the threshold $\Delta P_{th}$ (step S134: NO), the supervisory controller 23 repeats the processing from step S131 again to instruct the ONU 3 to "shift the wavelength by 5 GHz toward the short wavelength side". The optical access system 1 repeats the same processing until the change amount $\Delta P_{rec}$ becomes less than the threshold $\Delta P_{th}$.

In a case where the optical received power $P_{rec}$ is decreased from that in the previous measurement (step S133: NO), in contrast, this allows the supervisory controller 23 of the OLT 2 to determine that the wavelength is moved in a direction of becoming away from the center wavelength of the Gaussian transmittance of the AWG filter 4. In this case, the supervisory controller 23 instructs the ONU 3 to move the wavelength toward the opposite side of that in the instruction in step S131, for example, to "shift the wavelength by 5 GHz toward the long wavelength side" (step S136). The supervisory controller 33 of the ONU 3 changes the wavelength configured in the optical transmitter 32 toward the long wavelength side, in accordance with the wavelength adjustment instruction. The supervisory controller 23 measures the optical received power $P_{rec}$ again after waiting for a time period for the wavelength transition or after receiving a report of completion of the wavelength transition from the ONU 3 (step S137).

The supervisory controller 23 determines whether or not the optical received power $P_{rec}$ measured in step S137 is increased from that in the previous measurement (step S138). In a case where the supervisory controller 23 determines that the optical received power $P_{rec}$ is decreased (step S138: NO), the supervisory controller 23 performs processing in step S131. In a case where the supervisory controller 23 determines that the optical received power $P_{rec}$ is increased (step S138: YES), the supervisory controller 23 determines whether or not the change amount $\Delta P_{rec}$ of the optical received power $P_{rec}$ measured in step S137 from the initial value is less than the threshold $\Delta P_{th}$ (step S139). In a case where the supervisory controller 23 determines that the change amount $\Delta P_{rec}$ is less than the threshold $\Delta P_{th}$ (step S139: YES), the supervisory controller 23 terminates the wavelength calibration mode and changes to the normal mode (step S140). In a case where the supervisory controller 23 determines that the change amount $\Delta P_{rec}$ is equal to or greater than the threshold $\Delta P_{th}$ (step S139: NO), the supervisory controller 23 repeats the processing from step S136 again to instruct the ONU 3 to "shift the wavelength by 5 GHz toward the long wavelength side" again. The optical access system 1 repeats the same processing until the change amount $\Delta P_{rec}$ becomes less than the threshold $\Delta P_{th}$.

According to the application of the present embodiment, it is possible to modify an uplink wavelength shift in the ONU 3 with a simple configuration only with the monitor functions included typically in the optical transceivers of the OLT 2 and the ONU(s) 3 and the wavelength multiplexing/demultiplexing filters. In addition, it is also possible to discriminate between a shift in wavelength of the wavelength-variable light source and a decrease in optical transmission power, and this exerts an effect of quick reaction to failures.

Figure 4:
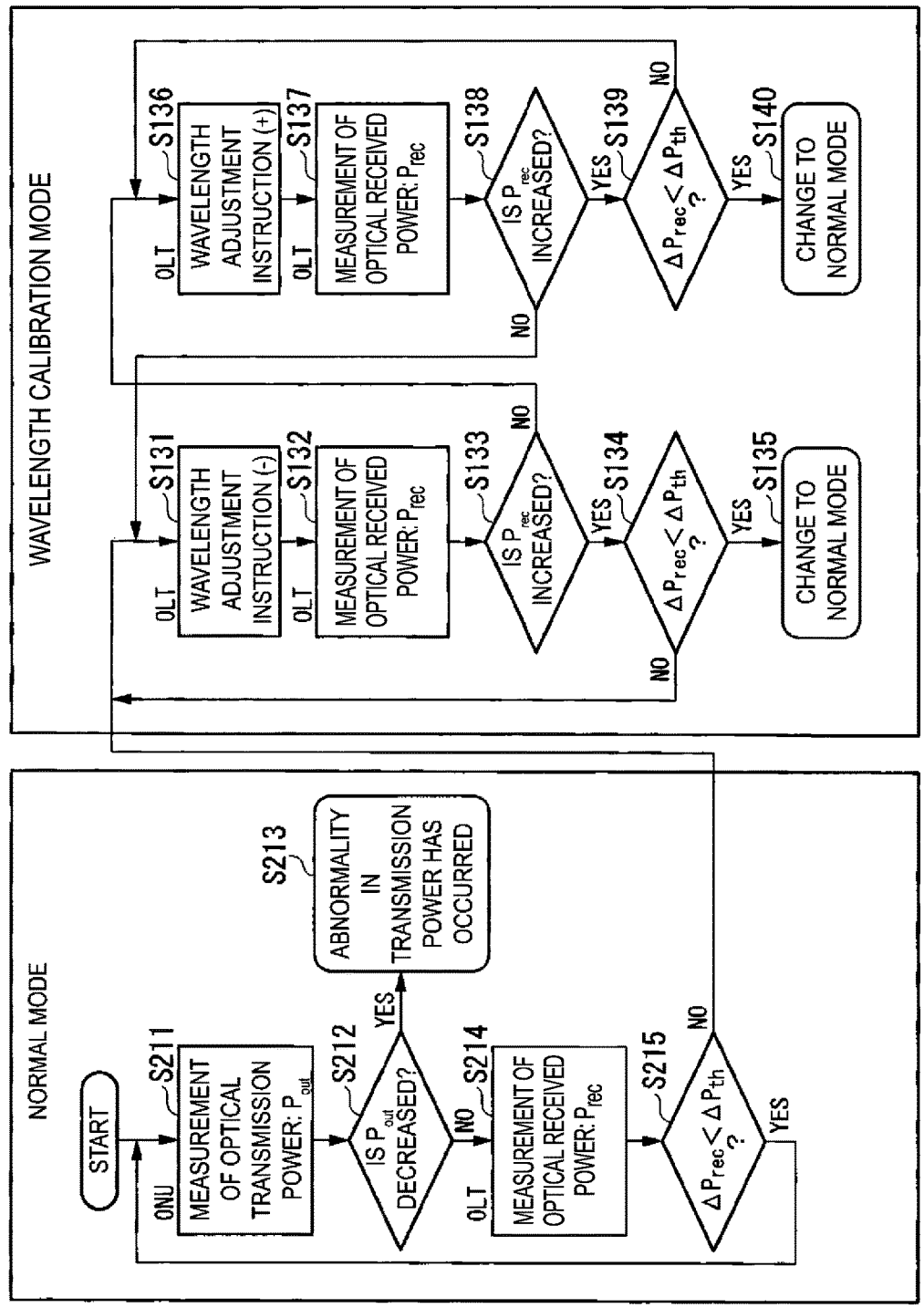
FIG. 4 is a flowchart illustrating a wavelength calibration process of the optical access system according to the embodiment.
Figure 5:
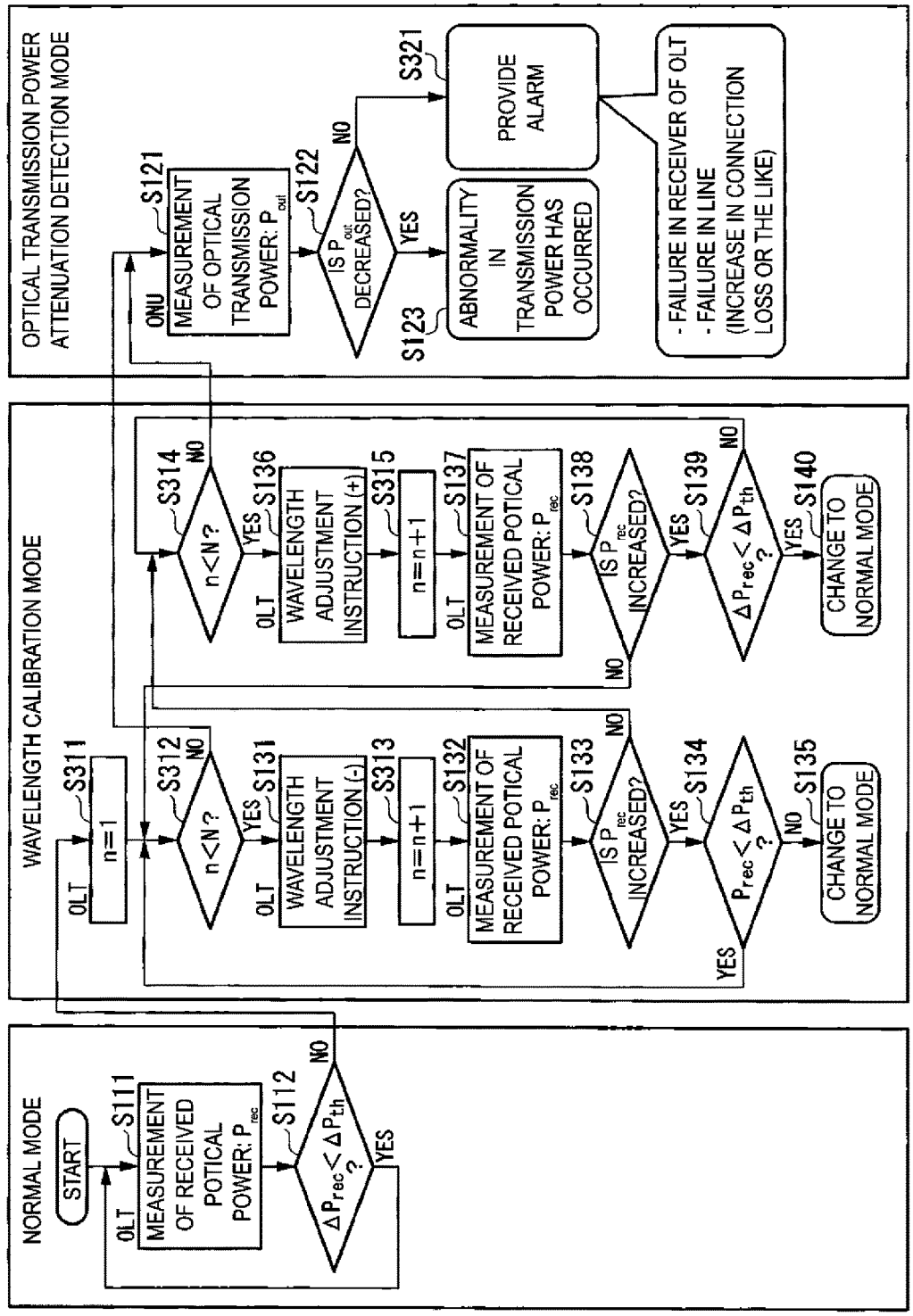
FIG. 5 is a flowchart illustrating a wavelength calibration process of the optical access system according to the embodiment.

It is also possible in the present embodiment to perform a process in which the timing of optical transmission power measurement by the ONU 3 is changed, as that illustrated in FIG. 4 or FIG. 5, instead of the process illustrated in FIG. 3.

FIG. 4 is a flowchart illustrating another wavelength calibration process of the optical access system 1. In FIG. 4, the same reference signs are used for the same steps as those in FIG. 3, and descriptions thereof will be omitted. In the wavelength calibration process illustrated in FIG. 4, an optical transmission power in the ONU 3 is measured during repetition of the normal mode. The repetition of the normal mode may start from measurement of an optical transmission power or may start from measurement of an optical received power.

In the normal mode, the supervisory controller 33 of the ONU 3 measures the optical transmission power $P_{out}$ in the optical transmitter 32 at an interval determined in advance by the telecommunications carrier and reports the optical transmission power $P_{out}$ to the OLT 2 by using a supervisory control signal (step S211). When receiving the report, the supervisory controller 23 of the OLT 2 checks whether the reported optical transmission power $P_{out}$ is decreased from the initial value (step S212). In a case where the supervisory controller 23 determines that the optical transmission power $P_{out}$ is decreased from the initial value (step S212: YES), the supervisory controller 23 provides an alarm indicating an abnormality in transmission power, as a report to the operator (step S213).

In a case where the supervisory controller 23 determines that the optical transmission power $P_{out}$ is not decreased from the initial value (step S212: NO), the supervisory controller 23 measures the optical received power $P_{rec}$ of the uplink signal by using the monitor PD mounted in the optical receiver 22 (step S214). The supervisory controller 23 determines whether the change amount $\Delta P_{rec}$ of the measured optical received power $P_{rec}$ from the initial value is less than the threshold $\Delta P_{th}$ (step S215). In a case where the supervisory controller 23 determines that the change amount rec is $\Delta P_{rec}$ less than the threshold $\Delta P_{th}$ (step S215: YES), the supervisory controller 23 continues being in the normal mode. The ONU 3 repeats the processing from step S211 at the next measurement timing.

In a case where the supervisory controller 23 of the OLT 2 determines that the change amount $\Delta P_{rec}$ is equal to or greater than the threshold $\Delta P_{th}$ (step S215: NO), in contrast, the supervisory controller 23 changes to the wavelength calibration mode. In the wavelength calibration mode, the optical access system 1 performs processing similar to that from step S131 to step S140 in FIG. 3.

FIG. 5 is a flowchart illustrating a still another wavelength calibration process of the optical access system 1. In FIG. 5, the same reference sign is used for the same processing as that in FIG. 3, and descriptions thereof will be omitted. In the wavelength calibration process illustrated in FIG. 5, when the change amount of an optical received power in the normal mode exceeds a threshold, the supervisory controller 23 immediately changes to the wavelength calibration mode. In this mode, the OLT 2 counts the number of times n of wavelength adjustment instructions. In a case where the change amount does not fall below the threshold even when the number of times n exceeds a specified number, the OLT 2 changes to the optical transmission power attenuation detection mode. The OLT 2 thereafter causes the ONU 3 to measure an optical transmission power, to check, by comparison to the initial value, whether the optical transmission power has not attenuated. In a case where the optical transmission power has attenuated, the OLT 2 provides an alarm indicating an abnormality in transmission power. In a case where the optical transmission power has not attenuated, the OLT 2 provides a different alarm. Conceivable examples of a factor for providing the different alarm include an increase in connection loss due to a failure of a line between the OLT 2 and the ONU 3, a decrease in optical received power resulting from an error in a measured optical received power due to a failure of a receiver of the OLT 2, and an excessive increase in optical transmission power due to a failure of an optical modulator or an excessive bias current.

In the normal mode, the optical access system 1 performs processing similar to that in the normal mode illustrated in FIG. 3 (step S111 to step S112). However, in a case where the supervisory controller 23 of the OLT 2 determines that the change amount $\Delta P_{rec}$ is equal to or greater than the threshold $\Delta P_{th}$ (step S112: NO), the supervisory controller 23 repeats the wavelength calibration mode.

In the wavelength calibration mode, the supervisory controller 23 of the OLT 2 configures the number of times n of wavelength adjustment instructions at an initial value, one (step S311). The supervisory controller 23 determines whether or not the value of the number of times n is less than a predetermined threshold N (step S312). In a case where the supervisory controller 23 determines that the number of times n is less than the threshold N, the supervisory controller 23 transmits a wavelength adjustment instruction to shift the wavelength toward the short wavelength side, by using a supervisory control signal, to the ONU 3 (step S131), and adds 1 to the value of the number of times n (step S313). The supervisory controller 33 of the ONU 3 shifts the wavelength configured in the optical transmitter 32 toward the short wavelength side, in accordance with the wavelength adjustment instruction.

The supervisory controller 23 of the OLT 2 measures the optical received power $P_{rec}$ (step S132).

In a case where the supervisory controller 23 determines that the measured optical received power $P_{rec}$ is increased from that in the previous measurement (step S133: YES), the supervisory controller 23 determines whether or not the change amount $\Delta P_{rec}$ the optical received power $P_{rec}$ from the initial value is less than the threshold $\Delta P_{rec}$ (step S134). In a case where the supervisory controller 23 determines that the change amount $\Delta P_{rec}$ is less than the threshold $\Delta P_{th}$ (step S134: YES), the supervisory controller 23 terminates the wavelength calibration mode and changes to the normal mode (step S135). In a case where the supervisory controller 23 determines that the change amount $\Delta P_{rec}$ is equal to or greater than the threshold $\Delta P_{th}$ (step S134: NO), the supervisory controller 23 repeats the processing from step S312 again.

In a case where the supervisory controller 23 determines that the optical received power $P_{rec}$ is decreased from that in the previous measurement (step S133: NO), in contrast, the supervisory controller 23 determines whether or not the value of the number of times n is less than the predetermined threshold N (step S314). In a case where the supervisory controller 23 determines that the number of times n is less than the threshold N, the supervisory controller 23 transmits a wavelength adjustment instruction to shift the wavelength toward the long wavelength side, by using a supervisory control signal, to the ONU 3 (step S136), and adds 1 to the value of the number of times n (step S315). The supervisory controller 33 of the ONU 3 shifts the wavelength configured in the optical transmitter 32 toward the long wavelength side, in accordance with the wavelength adjustment instruction.

The supervisory controller 23 of the OLT 2 measures the optical received power $P_{rec}$ (step S137).

In a case where the supervisory controller 23 determines that the measured optical received power $P_{res}$ is P not increased from that in the previous measurement (step S138: NO), the supervisory controller 23 performs the processing from step S312. In a case where the supervisory controller 23 determines that the optical received power $P_{rec}$ is increased (step S138: YES), the supervisory controller 23 determines whether or not the change amount $\Delta P_{rec}$ of the optical received power $P_{rec}$ from the initial value is less than the threshold $\Delta P_{th}$ (step S139). In a case where the supervisory controller 23 determines that the change amount $\Delta P_{rec}$ is less than the threshold $\Delta P_{th}$ (step S139: YES), the supervisory controller 23 terminates the wavelength calibration mode and changes to the normal mode (step S140). In a case where the supervisory controller 23 determines that the change amount $\Delta P_{rec}$ is $\Delta P_{rec}$ equal to or greater than the threshold $\Delta P_{th}$ (step S139: NO), the supervisory controller 23 repeats the processing from step S314 again.

In a case where the supervisory controller 23 determines that the number of times n is equal to or greater than the threshold N (step S312: NO, step S314: NO), the supervisory controller 23 changes to the optical transmission power attenuation detection mode. In the optical transmission power attenuation detection mode, the supervisory controller 23 instructs the ONU 3 to report an optical transmission power, by using a supervisory control signal. The supervisory controller 33 of the ONU 3 measures an optical transmission power $P_{out}$ in the optical transmitter 32 at the time of receiving the instruction and reports the optical transmission power $P_{out}$ to the OLT 2 by using the supervisory control signal (step S121). In a case where the supervisory controller 23 of the OLT 2 determines that the reported optical transmission power $P_{out}$ is decreased from the initial value by the predetermined value or more (step S122: YES), the supervisory controller 23 provides an alarm indicating an abnormality in transmission power, as a report to the operator (step S123). In a case where the supervisory controller 23 of the OLT 2 determines that the reported optical transmission power $P_{out}$ is not decreased from the initial value by the predetermined value or more (step S122: NO), in contrast, the supervisory controller 23 provides a different alarm (step S321).

The above-described wavelength calibration processes illustrated in FIG. 3 to FIG. 5 assume a case of having no wavelength shift in the ONU 3 at the time of initial connection. However, a wavelength shift to some extent may occur at the time of initial connection. When a wavelength shift occurs at the time of initial connection, the reference value of an optical received power may decrease, particularly in a filter having Gaussian characteristics. In view of this, in a case that a wavelength shift may occur at the time of initial connection, the optical access system 1 of the present embodiment performs a wavelength calibration process in an initial connection mode, and registers, in the OLT 2, an initial value of an optical received power and an initial value of an optical transmission power in a calibrated state.

Figure 6:
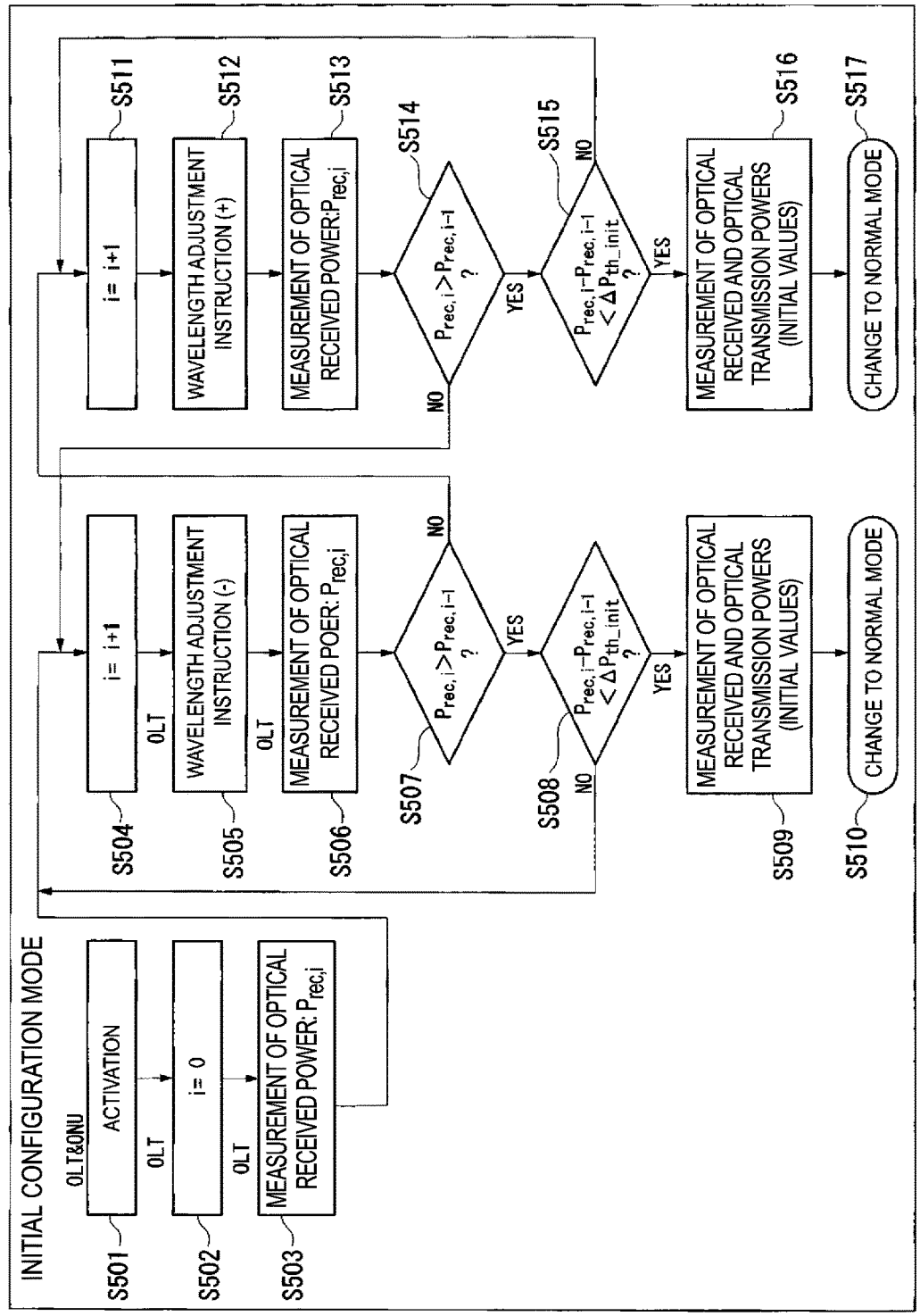
FIG. 6 is a flowchart illustrating a wavelength calibration process in an initial configuration mode of the optical access system according to the embodiment.

FIG. 6 is a flowchart illustrating the wavelength calibration process for the initial configuration mode of the optical access system 1. In the wavelength calibration process illustrated in FIG. 6, first, when a new ONU 3 is connected to the optical access system 1 (PON system), an initial connection operation (activation), such as wavelength assignment or ONU registration, is performed between the OLT 2 and the ONU 3 (step S501). The supervisory controller 23 of the OLT 2 configures the number of times i of wavelength adjustment instructions at an initial value, zero (step S502). The supervisory controller 23 thereafter measures an optical received power $P_{rec,i}$ after transmission through the AWG filter 4, by using the monitor PD mounted in the optical receiver 22 in the OLT 2, and records the optical received power $P_{rec,i}$ in a storage unit (not illustrated) (step S503).

The supervisory controller 23 subsequently adds one to the value of the number of times i (step S504), and transmits a wavelength adjustment instruction toward the short wavelength side, to the ONU 3 (step S505). The supervisory controller 33 of the ONU 3 changes the wavelength configured in the optical transmitter 32 toward the short wavelength side, in accordance with the wavelength adjustment instruction. The supervisory controller 23 of the OLT 2 thereafter measures the optical received power $P_{rec,i}$ after waiting for a time period for the wavelength transition or after receiving a report of completion of the wavelength transition from the ONU 3 (step S506).

The supervisory controller 23 reads an optical received power $P_{rec,i-1}$ measured in the previous, (i−1)-th measurement, from the storage unit and determines whether or not the optical received power $P_{rec,i}$ measured in the present, i-th measurement in step S506 is increased from the optical received power $P_{rec,i-1}$ measured in the previous measurement (step S507). In a case where the optical received power $P_{rec,i}$ is increased from that in the previous measurement (step S507: YES), the supervisory controller 23 determines that the wavelength is calibrated toward the center wavelength.

The supervisory controller 23 subsequently calculates the difference between the optical received power $P_{rec,i}$ measured in the present measurement in step S506 and the optical received power $P_{rec,i-1}$ measured in the previous measurement. The supervisory controller 23 determines whether or not the calculated difference $P_{rec,i}-P_{rec,i-1}$ falls below a predetermined threshold $\Delta P_{th\_init}$ (step S508). The threshold $\Delta P_{th\_init}$ is determined based on the characteristics of the AWG filter 4. For example, in a case of using an AWG filter having an interval of 100 GHz, it is assumed that the wavelength having a shift of ±5 GHz from the center wavelength has a difference of 0.1 dB in transmission loss amount in comparison with the center wavelength. In this case, assume that a wavelength adjustment instruction is provided in a unit of −3 GHz, the change amount $P_{rec,i}-P_{rec,i-1}$ of the optical received power within +5 GHz of the center wavelength is below 0.1 dB. By defining the threshold $\Delta P_{th\_init}$ as 0.1 dB, it is possible to determine whether or not the wavelength of an uplink signal light from the ONU 3 is near the center wavelength, depending on whether the difference is below the threshold $\Delta P_{th\_init}$.

In a case where the supervisory controller 23 determines that the difference is equal to or greater than the threshold (step S508: NO), the supervisory controller 23 stores the optical received power $P_{rec,i}$ in the storage unit and repeats the processing from step S504 again. In a case where the supervisory controller 23 determines that the difference is less than the threshold value (step S508: YES) and that the optical received power $P_{rec,i}$ is P near the center wavelength, in contrast, the supervisory controller 23 measures the optical received power at the time of determination and further instructs the ONU 3 to report an optical transmission power, by using a supervisory control signal. The supervisory controller 23 registers, in the storage unit, the measured optical received power and the optical transmission power measured by the ONU 3 in accordance with the instruction and reported to the OLT 2 by using the supervisory control signal, as initial values (step S509), and changes to the normal mode (step S510).

In a case where the optical received power $P_{rec,i}$ measured in the present measurement in step S506 is not increased from the optical received power $P_{rec,i-1}$ measured in the previous measurement (step S507: NO), in contrast, the supervisory controller 23 determines that the wavelength is calibrated in a direction of becoming away from the center wavelength. The supervisory controller 23 stores the measured optical received power $P_{rec,i}$ in the storage unit and then adds one to the value of the number of times i (step S511). The supervisory controller 23 transmits a wavelength adjustment instruction with a sign opposite to that in step S505, to the ONU 3 (step S512). For example, in a case of providing an instruction to "shift the wavelength by −3 GHz" in step S505, the supervisory controller 23 provides an instruction to "shift the wavelength by +3 GHz". The supervisory controller 33 of the ONU 3 changes the wavelength configured in the optical transmitter 32 toward the long wavelength side, in accordance with the received wavelength adjustment instruction. The supervisory controller 23 of the OLT 2 thereafter measures the optical received power $P_{rec,i}$ (step S513).

The supervisory controller 23 reads an optical received power $P_{rec,i-1}$ measured in the previous, (i−1)-th measurement, from the storage unit and determines whether or not the optical received power $P_{rec,i}$ measured in the present, i-th measurement in step S513 is increased from the optical received power $P_{rec,i-1}$ measured in the previous measurement (step S514). In a case where the optical received power $P_{rec,i}$ not increased from that in the previous measurement (step S514: NO), the supervisory controller 23 determines that the wavelength is calibrated in a direction of becoming away from the center wavelength, and stores the optical received power $P_{rec,i}$ in the storage unit and then performs the processing from step S504. In a case where the optical received power $P_{rec,i}$ is increased from that in the previous measurement (step S514: YES), in contrast, the supervisory controller 23 determines that the wavelength is calibrated toward the center wavelength.

The supervisory controller 23 subsequently determines whether or not the difference between the optical received power $P_{rec,i}$ measured in the present measurement in step S513 and the optical received power $P_{rec,i}$ measured in the previous measurement is below the threshold $\Delta_{th\_init}$ (step S515). In a case where the supervisory controller 23 determines that the difference is equal to or greater than the threshold (step S515: NO), the supervisory controller 23 repeats the processing from step S511 again. In a case where the supervisory controller 23 determines that the difference is less than the threshold value (step S515: YES) and that the optical received power $P_{rec,i}$ is P near the center wavelength, in contrast, the supervisory controller 23 measures the optical received power at the time of determination and further instructs the ONU 3 to report an optical transmission power, by using a supervisory control signal. The supervisory controller 23 registers the measured optical received power and the optical transmission power measured by the ONU 3 in accordance with the supervisory control signal and reported to the OLT 2, as initial values in the storage unit (step S516), and changes to the normal mode (step S517).

Figure 7:
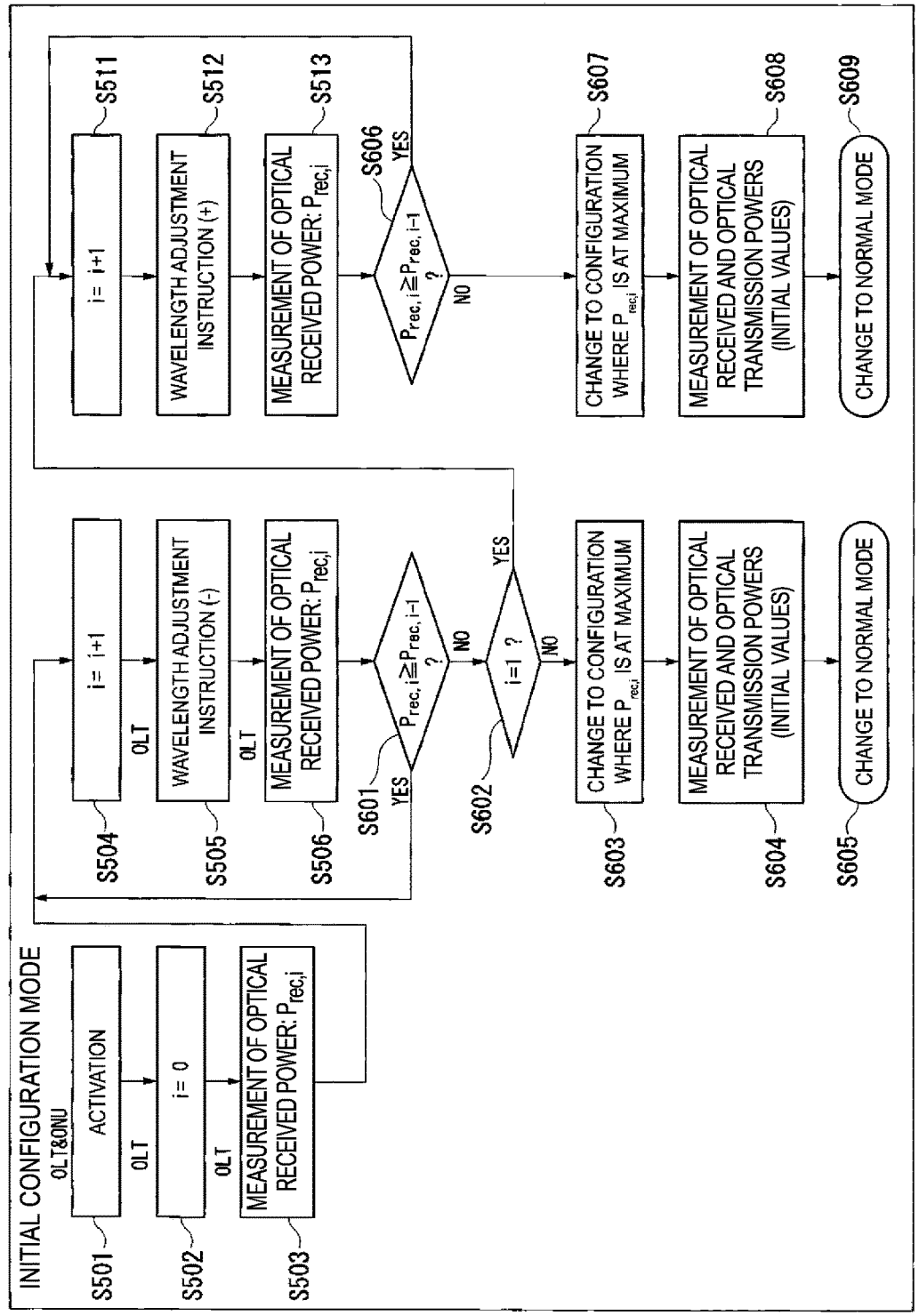
FIG. 7 is a flowchart illustrating a wavelength calibration process in the initial configuration mode of the optical access system according to the embodiment.

FIG. 7 is a flowchart illustrating another wavelength calibration process for the initial configuration mode in the optical access system 1. In FIG. 7, the same reference sign is used for the same processing as that in FIG. 6, and descriptions thereof will be omitted. The wavelength calibration process illustrated in FIG. 7 and the wavelength calibration process illustrated in FIG. 6 are different in operation after the OLT 2 compares the optical received power $P_{rec,i-1}$ measured in the (i−1)-th measurement and the optical received power $P_{rec,i}$ measured in the i-th measurement.

In FIG. 7, the optical access system 1 performs processing similar to that from step S501 to step S506 in FIG. 6. Note that the supervisory controller 33 of the ONU 3 counts the number of times i the wavelength adjustment instruction is received from the OLT 2, and stores an uplink wavelength after adjustment in accordance with the i-th wavelength adjustment instruction, in the storage unit (not illustrated) provided inside or outside the supervisory controller 33.

After the processing in step S506, the supervisory controller 23 of the OLT 2 reads the optical received power $P_{rec,i-1}$ measured in the previous, (i−1)-th measurement, from the storage unit and determines whether or not the optical received power $P_{rec,i}$ measured in the present, i-th measurement in step S506 is equal to or greater than the optical received power $P_{rec,i}$ measured in the previous measurement (step S601). In a case where the optical received power $P_{rec,i}$ is equal to or greater than the optical received power $P_{rec,i-1}$ measured in the previous measurement (step S601: YES), the supervisory controller 23 determines that the wavelength is calibrated toward the center wavelength and stores the measured optical received power $P_{rec,i}$ in the storage unit. The supervisory controller 23 repeats the processing from step S504 to add one to the value of the number of times i and transmits a wavelength adjustment instruction toward the short wavelength side, to the ONU 3.

In a case where the supervisory controller 23 determines that the optical received power $P_{rec,i}$ measured in the present measurement in step S506 is smaller than the optical received power $P_{rec,i-1}$ measured in the previous measurement (step S601: NO), in contrast, the supervisory controller 23 determines whether or not the number of times i is one (step S602). In a case where the number of times i is greater than one (step S602: NO), the supervisory controller 23 determines that the wavelength is adjusted too far beyond the center wavelength through the plurality of wavelength adjustment instructions. In this case, the supervisory controller 23 obtains the transmittance of the AWG filter 4 from the previous adjustment records. In other words, the supervisory controller 23 transmits a wavelength adjustment instruction to the ONU 3 so as to apply the wavelength configuration at the time with the number of times i where the optical received power stored in the storage unit is the greatest (step S603). The ONU 3 configures the wavelength in the optical transmitter 32 in accordance with the received wavelength adjustment instruction.

The supervisory controller 23 thereafter measures the optical received power $P_{rec}$ again after waiting for a time period for the wavelength transition or after receiving a report of completion of the wavelength transition from the ONU 3, and stores the measured optical received power $P_{rec}$ as an initial value in the storage unit. Alternatively, the supervisory controller 23 may define, with reference to the records in the storage unit when the optical received power $P_{rec,i}$ is at the maximum, the optical received power $P_{rec,i}$ as an initial value. The supervisory controller 23 of the OLT 2 instructs the ONU 3 to report an optical transmission power, via the supervisory control channel. In response to this instruction, the supervisory controller 33 of the ONU 3 measures an optical transmission power by using an optical transmission power monitor function provided in the optical transmitter 32, and reports the optical transmission power to the OLT 2 via the supervisory control channel. The supervisory controller 23 of the OLT 2 stores the reported optical transmission power as an initial value in the storage unit (step S604). The supervisory controller 23 changes to the normal mode (step S605).

In a case where the optical received power $P_{rec,i}$ is not equal to or greater than that in the previous measurement and i is equal to 1 (i=1) (step S602: YES), the supervisory controller 23 determines that the wavelength is calibrated in a direction of becoming away from the center wavelength. The supervisory controller 23 stores the measured optical received power $P_{rec,i}$ in the storage unit, performs processing similar to steps S511 to S513 in FIG. 6, and transmits a wavelength adjustment instruction with a sign opposite to that in step S505, to the ONU 3. After the processing in step S513, the supervisory controller 23 of the OLT 2 determines whether or not the optical received power $P_{rec,i}$ measured in the present, i-th measurement in step S513 is equal to or greater than the optical received power $P_{rec,i-1}$ measured in the previous, (i−1)-th measurement (step S606). In a case where the optical received power $P_{rec,i}$ is P equal to or greater than the optical received power $P_{rec,i-1}$ measured in the previous measurement (step S606: YES), the supervisory controller 23 determines that the wavelength is calibrated toward the center wavelength, stores the measured optical received power $P_{rec,i}$ in the storage unit, and repeats the processing from step S511.

In a case where the supervisory controller 23 determines that the optical received power $P_{rec,i}$ measured in the present, i-th measurement is smaller than the optical received power $P_{rec,i-1}$ measured in the previous measurement (step S606: NO), in contrast, the supervisory controller 23 determines that the wavelength is adjusted too far beyond the center wavelength through the plurality of wavelength adjustment instructions.

The supervisory controller 23 performs processing similar to that in steps S603 and S604. (steps S607 and S608). In other words, the supervisory controller 23 applies the wavelength configuration at the time of the number of times i where the optical received power $P_{rec,i}$ is at the maximum, to the ONU 3, and registers the optical received power and optical transmission power in this case as initials in the storage unit. The supervisory controller 23 changes to the normal mode (step S609).

By performing the above-described initial connection process, it is also possible to perform wavelength calibration even in a case where an initial transmission wavelength is shifted.

Second Embodiment

The present embodiment uses, as a wavelength multiplexing/demultiplexing filter, a filter with flat-top transmittance, such as a dielectric multilayer film filter, instead of the AWG filter of the first embodiment.

Figure 8:
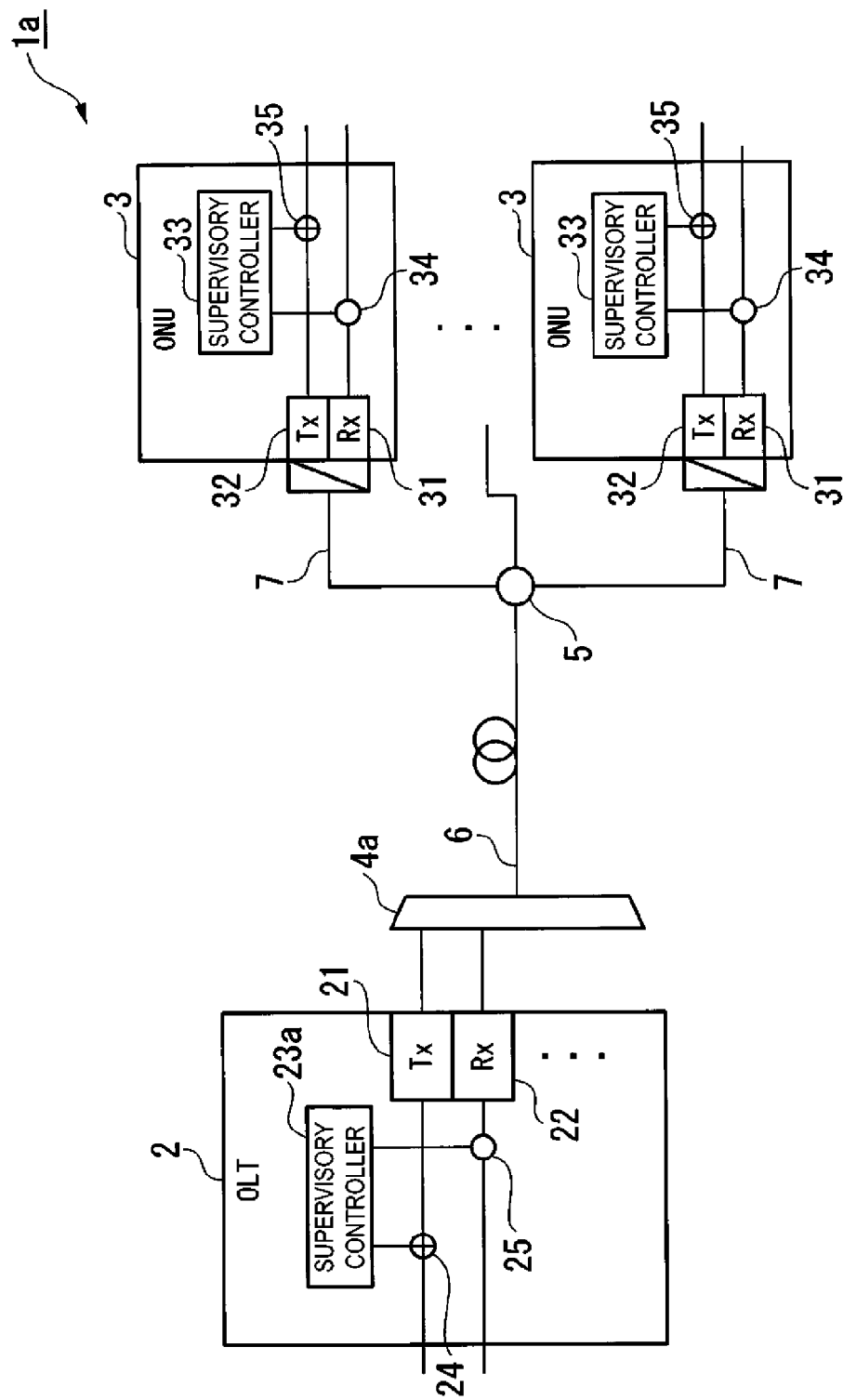
FIG. 8 is a diagram illustrating a configuration of an optical access system according to a second embodiment.

FIG. 8 is a diagram illustrating a configuration of an optical access system 1a according to the second embodiment of the present invention. In FIG. 8, the same reference signs are used for the same parts as those of the optical access system 1 according to the first embodiment illustrated in FIG. 1, and descriptions thereof will be omitted. The optical access system 1a of the present embodiment is different from the optical access system 1 illustrated in FIG. 1 in that the optical access system 1a includes an OLT 2a and a dielectric multilayer film filter 4a instead of the OLT 2, and the AWG filter 4. The OLT 2a is different from the OLT 2 of the first embodiment in that the OLT 2a includes a supervisory controller 23a instead of the supervisory controller 23. The supervisory controller 23a shifts a wavelength toward the short wavelength side and the long wavelength side in the normal mode and detects a wavelength shift. Note that a dielectric multilayer film filter 4a may be provided in the OLT 2a.

Figure 9:
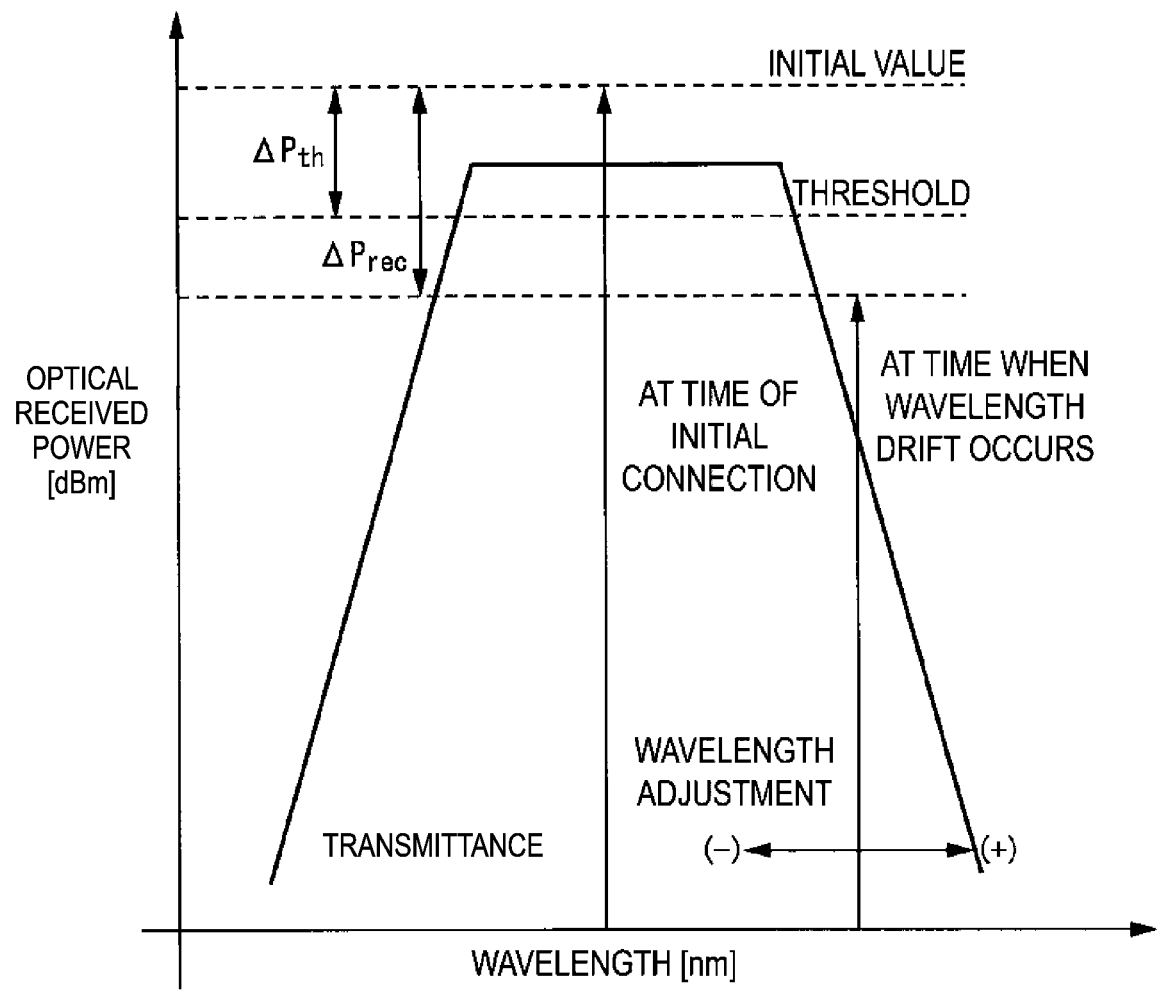
FIG. 9 is a diagram illustrating transmittance of a dielectric multilayer film filter according to the embodiment.

FIG. 9 is a diagram illustrating transmittance of the dielectric multilayer film filter 4a. FIG. 9 illustrates an optical received power in the optical receiver 22 in the OLT 2a after transmission through the dielectric multilayer film filter 4a. The flat-top transmittance have a substantially fixed attenuation amount in a transmission band but have an abrupt change in optical attenuation amount outside the transmission band in comparison with that of a Gaussian filter. When the uplink wavelength of the ONU 3 comes to be outside the transmission band, the OLT 2a provides an instruction to shift the uplink wavelength toward the short wavelength side (−) or the long wavelength side (+) to adjust the wavelength.

The OLT 2a and the ONU 3 perform an initial connection operation similar to that in the first embodiment, and the supervisory controller 23a of the OLT 2a acquires an initial value of the optical received power in the optical receiver 22 and an initial value of an optical transmission power from the optical transmitter 32 of the ONU 3, and stores the initial values in a storage unit (not illustrated) provided inside or outside the supervisory controller 23a. The OLT 2a then performs the processing in the normal mode.

Figure 10:
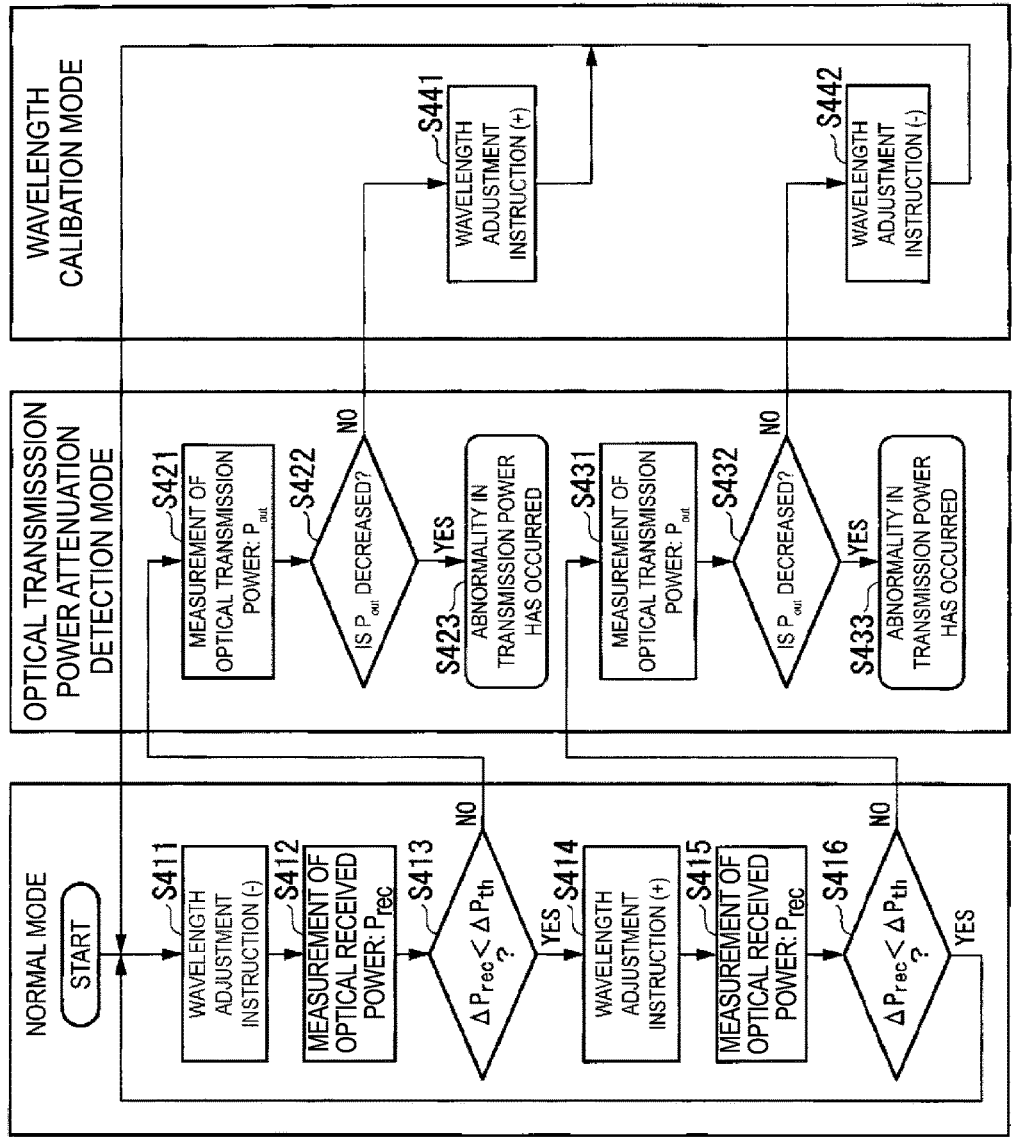
FIG. 10 is a flowchart illustrating a wavelength calibration process of the optical access system according to the embodiment.
Figure 11:
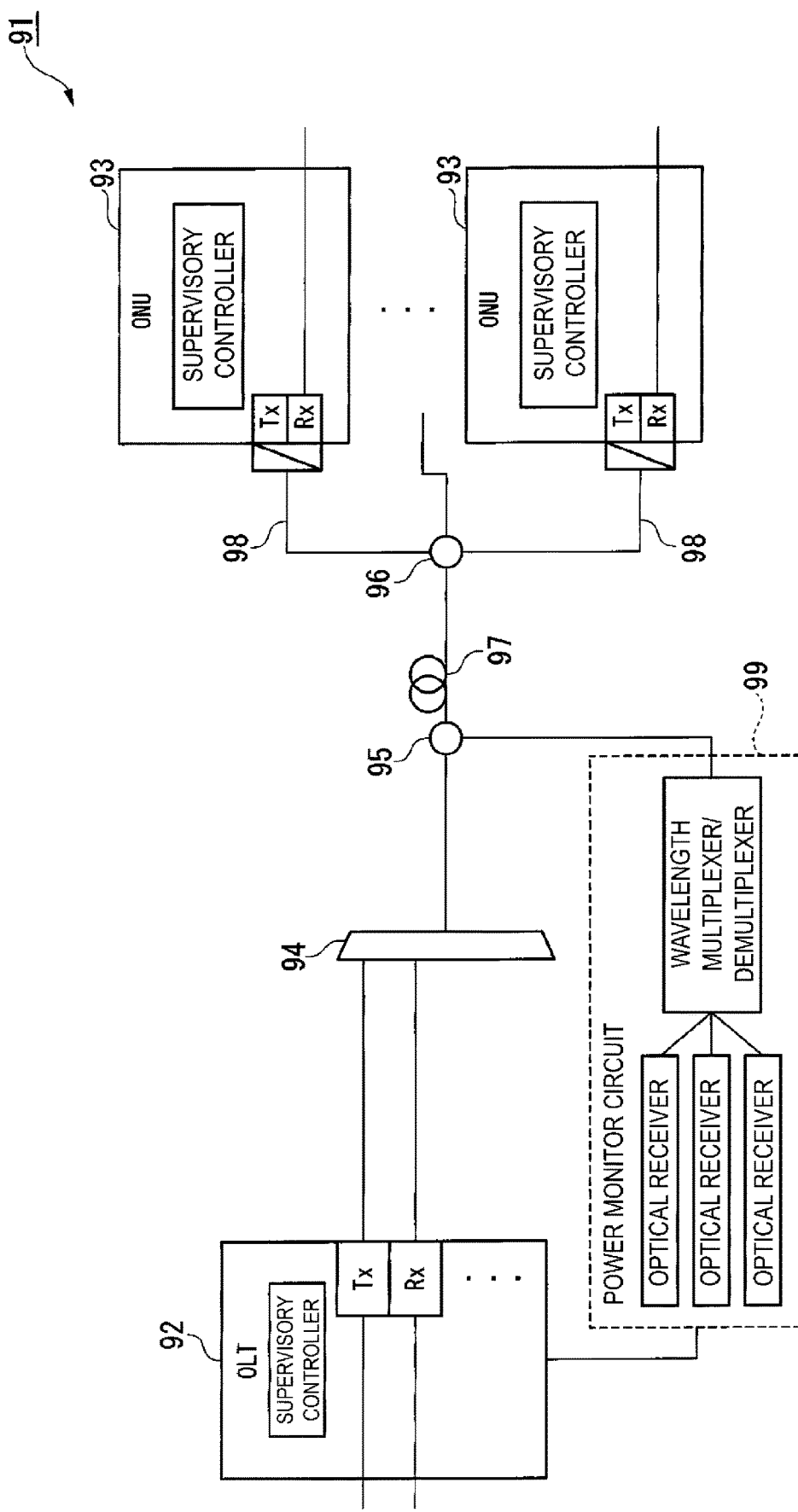
FIG. 11 is a diagram illustrating a known optical communication system.

FIG. 10 is a flowchart illustrating a wavelength calibration process of the optical access system 1a. The optical access system 1a performs, after completing the initial connection described above for each ONU 3, wavelength calibration with the wavelength calibration process illustrated in FIG. 10.

In the normal mode, the OLT 2a periodically instructs the ONU 3 by using a supervisory control signal to perform a wavelength transition for a small amount within a predetermined range, for example, transition by 5 GHz to each of the short wavelength and long wavelength sides. A wavelength transition amount in this case is defined, for example, at one tenth of the bandwidth of the flat-top characteristics or the like, with reference to the specification defining a degree of the flat-top characteristics. The ONU 3 performs the wavelength transition in accordance with the instruction. Thereafter, the OLT 2a measures the change amount of the optical received power and compares the change amount with the initial optical received power. When no wavelength shift has occurred yet, the change amount $\Delta P_{rec}$ of the optical received power due to a small amount of wavelength transition is below the threshold $\Delta P_{th}$ according to the flat-top characteristics of the wavelength multiplexing/demultiplexing filter. At the time when a wavelength shift occurs, the wavelength comes out of a transmission wavelength range due to wavelength transition, and the optical received power decreases to cause the change amount $\Delta P_{rec}$ to exceed the threshold $\Delta P_{th}$. This changes to the optical transmission power attenuation detection mode. FIG. 9 illustrates a wavelength drift of an uplink wavelength in a case of changing to the optical transmission power attenuation detection mode.

In the optical transmission power attenuation detection mode, the OLT 2a instructs the ONU 3 to report an optical transmission power. The ONU 3 measures the optical transmission power at the time of receiving the instruction and reports the optical transmission power to the OLT 2a. When receiving the report, the OLT 2a checks whether or not the optical transmission power is decreased from the initial value. In a case where a decrease is confirmed, the OLT 2a provides an alarm indicating an abnormality in transmission power, as a report to the operator. In a case where such decrease in optical transmission power is not confirmed, this means that only the optical received power is decreased and allows the OLT 2a to consequently detect that a wavelength shift has occurred. This changes to the wavelength calibration mode.

In the wavelength calibration mode, the OLT 2a transits an uplink wavelength of the ONU 3 at half the width of the flat-top characteristics specified in the specification, to bring the wavelength closer to the original position of the wavelength. The direction of the wavelength transition in this case is configured so as to be in a direction opposite to the direction of the wavelength adjustment instruction in the case of changing from the normal mode to the optical transmission power attenuation detection mode.

The processing in FIG. 10 will be described in detail. In the normal mode, the supervisory controller 23a of the OLT 2a transmits a wavelength adjustment instruction to shift the wavelength toward the short wavelength side, for example, by 5 GHz, to the ONU 3 (step S411). The supervisory controller 33 of the ONU 3 changes the wavelength configured in the optical transmitter 32 toward the short wavelength side, in accordance with the wavelength adjustment instruction. The supervisory controller 23a of the OLT 2a measures the optical received power $P_{rec}$ (step S412). The supervisory controller 23a determines whether or not the change amount $\Delta P_{rec}$ of P the optical received power $P_{rec}$ measured in step S412 from the initial value is less than the threshold $\Delta P_{th}$ (step S413). In a case where the supervisory controller 23a determines that the change amount $\Delta P_{rec}$ is less than the threshold $\Delta P_{th}$ (step S413: YES), the supervisory controller 23a performs the processing in step S414.

The supervisory controller 23a transmits a wavelength adjustment instruction to shift the wavelength toward the long wavelength side, for example, by 5 GHz, to the ONU 3 (step S414). The supervisory controller 33 of the ONU 3 changes the wavelength configured in the optical transmitter 32 toward the long wavelength side, in accordance with the wavelength adjustment instruction. The supervisory controller 23a of the OLT 2a measures the optical received power $P_{rec}$ (step S415). The supervisory controller 23a determines whether or not the change amount $\Delta P_{rec}$ of the optical received power $P_{rec}$ measured in step S415 from the initial value is less than the threshold $\Delta P_{th}$ (step S416). In a case where the supervisory controller 23a determines that the change amount $\Delta P_{rec}$ is less than the threshold $\Delta P_{th}$ (step S416: YES), the supervisory controller 23a continues being in the normal mode and repeats the processing from step S411.

In a case where the supervisory controller 23a determines that the change amount $\Delta P_{rec}$ after the wavelength adjustment toward the short wavelength side is equal to or greater than the threshold $\Delta P_{th}$ (step S413: NO), the supervisory controller 23a changes to the optical transmission power attenuation detection mode and performs the processing in step S421. The supervisory controller 23a instructs the ONU 3 to report an optical transmission power, by using a supervisory control signal. The supervisory controller 33 of the ONU 3 measures the optical transmission power $P_{out}$ in the optical transmitter 32 at the time of receiving the instruction and reports the optical transmission power $P_{out}$ to the OLT 2a by using a supervisory control signal (step S421). The supervisory controller 23a of the OLT 2a checks whether or not the optical transmission power $P_{out}$ reported by using the supervisory control signal is decreased from the initial value by a predetermined value or more (step S422). In a case where the supervisory controller 23a determines that the optical transmission power $P_{out}$ is decreased from the initial value by the predetermined value or more (step S422: YES), the supervisory controller 23a provides an alarm indicating an abnormality in transmission power, as a report to the operator (step S423).

In a case where the supervisory controller 23a determines that the optical transmission power $P_{out}$ is not decreased from the initial value by the predetermined value or more (step S422: NO), in contrast, the supervisory controller 23a changes to the wavelength calibration mode and performs the processing in step S441. The supervisory controller 23a transmits a wavelength adjustment instruction toward the long wavelength side, to the ONU 3 (step S441). The supervisory controller 23a changes to the normal mode and repeats the processing from step S411.

In a case where the supervisory controller 23a of the OLT 2a determines that the change amount $\Delta P_{rec}$ after the wavelength adjustment toward the long wavelength side is equal to or greater than the threshold $\Delta P_{th}$, in step S416 in the normal mode (step S416: NO), the supervisory controller 23a changes to the optical transmission power attenuation detection mode and performs the processing in step S431. The supervisory controller 23a instructs the ONU 3 to report an optical transmission power, by using a supervisory control signal. The supervisory controller 33 of the ONU 3 measures an optical transmission power $P_{out}$ in the optical transmitter 32 at the time of receiving the instruction and reports the optical transmission power $P_{out}$ to the OLT 2a by using a supervisory control signal (step S431). The supervisory controller 23a of the OLT 2a checks whether or not the optical transmission power $P_{out}$ reported by using the supervisory control signal is decreased from the initial value by a predetermined value or more (step S432).

In a case where the supervisory controller 23a determines that the optical transmission power $P_{out}$ is decreased from the initial value by the predetermined value or more (step S432: YES), the supervisory controller 23a provides an alarm indicating an abnormality in transmission power, as a report to the operator (step S433).

In a case where the supervisory controller 23a determines that the optical transmission power $P_{out}$ is not decreased from the initial value by the predetermined value or more (step S432: NO), in contrast, the supervisory controller 23a changes to the wavelength calibration mode and performs the processing in step S442. The supervisory controller 23a transmits a wavelength adjustment instruction toward the short wavelength side, to the ONU 3 (step S442). The supervisory controller 23a changes to the normal mode and repeats the processing from step S411.

The application of the present embodiment makes it possible to perform, with a simpler configuration, wavelength calibration and discriminate the cause of a failure in a case where a wavelength multiplexer/demultiplexer has flat-top transmittance. A filter having flat-top transmittance has an abrupt change in optical attenuation amount in the outside of a transmission band in comparison with that of a Gaussian filter. This allows detection of a wavelength shift and calibration in an early stage in comparison with a case of measuring only an optical received power by using a small amount of wavelength transition.

Note that a structure may be employed in which the supervisory controller 23 or 23a is included in an external apparatus connected to the OLT 2 or 2a or in which part of the functions of the supervisory controller 23 or 23a is provided in the external apparatus.

According to the embodiment described above, an AWG or a dielectric multilayer film filter is used as a wavelength multiplexing/demultiplexing circuit in an optical communication system using wavelength multiplexing, such as a WDM-PON or a WDM/TDM-PON. An optical received power after transmission through the wavelength separation circuit is measured by the monitor PD included in the optical receivers 22 or 22a of the OLT 2 or 2a, and an optical transmission power is measured by using the optical transmission power monitor function included in the optical transmitter 32 of the ONU 3. The OLT 2 or 2a measures these two optical powers at frequencies determined in advance by the telecommunications carrier, detects a wavelength shift through a comparison with an initial value measured at the time of an initial connection operation, such as wavelength assignment or ONU registration, and performs wavelength calibration.

Hence, it is possible to decrease the cost with the use of a simple structure with no need of a power monitor circuit including an expensive narrow line width wavelength multiplexer/demultiplexer and power monitor optical receivers as many as ONUs in the known art. According to the present embodiment, it is also possible to discriminate between a shift in wavelength of a wavelength-variable light source and a decrease in an optical transmission power, and this exerts an effect of quick reaction to failures.

Each of the OLTs 2 and 2a and the ONU 3 described above includes a central processing unit (CPU), a memory, an auxiliary storage device, and the like connected via a bus, and functions as an apparatus including the corresponding one of the supervisory controllers 23 and 23a and the supervisory controller 33 by executing a program. Note that all or some of the functions of the supervisory controllers 23 and 23a and the supervisory controller 33 may be implemented by using hardware, such as an application specific integrated circuit (ASIC), a programmable logic device (PLD), and a Field programmable gate array (FPGA). The program may be recorded in a computer-readable recording medium. The computer-readable recording medium is a portable medium such as a flexible disk, a magneto-optical disk, a ROM or a CD-ROM, or a storage device such as a hard disk drive built into a computer system. The program may be transmitted over an electrical communication line.

According to the above-described embodiments, the optical communication apparatus communicates with one or more other optical communication apparatuses by wavelength multiplexing. For example, the optical communication apparatus is the OLT 2 or 2a, and the other optical communication apparatus(es) is the ONU(s) 3. Each of the optical communication apparatus and another transmission source apparatus has the function of generating and reading a supervisory control signal, and superimposes a supervisory control signal on a main signal to transmit the resultant signal. The optical communication apparatus includes one or more optical receivers and a supervisory controller. The optical receivers receive optical signals having respective different wavelengths obtained by a wavelength demultiplexer demultiplexing a wavelength-multiplexed signal addressed to the optical communication apparatus itself. The supervisory controller transmits, to the transmission source apparatus, a wavelength adjustment instruction, which is a supervisory control signal, to transit a wavelength to be used by an optical transmitter to transmit an optical signal, to set the difference between a received power of an optical signal received by the optical receiver and a reference value of the received power within a threshold, the transmission source apparatus being another optical communication apparatus which is a transmission source of the optical signal. For example, the optical receiver is the optical receiver 22, and the optical transmitter is the optical transmitter 32.

The supervisory controller detects, when receiving a report of an optical transmission power in the optical transmitter from the transmission source apparatus, an abnormality in transmission power in the optical transmitter, based on a comparison between the optical transmission power thus reported and an initial value of the optical transmission power in the optical transmitter. Note that, in a case of determining that the difference between the optical received power and the reference value is equal to or greater than the threshold, the supervisory controller may instruct the transmission source apparatus to report an optical transmission power the optical transmitter, by using a supervisory control signal. The supervisory controller determines that an abnormality of the optical transmitter has occurred, when the optical transmission power reported from the transmission source apparatus in response to the instruction is decreased from the initial value by a predetermined value or more, and determines that a wavelength shift has occurred in the optical transmitter, when a decrease from the initial value is within the predetermined value.

In a case that the wavelength demultiplexer is a filter having Gaussian transmittance (e.g., the AWG filter 4), the supervisory controller may transmit a wavelength adjustment instruction to the transmission source apparatus when the supervisory controller determines that the difference between the optical received power and the reference value is equal to or greater than the threshold value. The supervisory controller determines the direction of the wavelength shift by comparing the optical received power before and after transmitting the wavelength adjustment instruction, and transmits a wavelength adjustment instruction to the transmission source apparatus to transit the wavelength with reference to the determined direction of the wavelength shift.

In a case that the wavelength demultiplexer is a filter having Gaussian transmittance, the supervisory controller may transmit, to the transmission source apparatus, a wavelength adjustment instruction to transit the wavelength of an optical signal to be transmitted from the optical transmitter by a certain amount, when the supervisory controller determines that the difference between the optical received power and the reference value is equal to or greater than the threshold value. In a case that the difference does not fall within the threshold even after repeating transmission of the wavelength adjustment instruction a predetermined number of times, the supervisory controller instructs the transmission source apparatus to report an optical transmission power, by using a supervisory control signal, and determines whether an abnormality in the optical transmitter or another failure has occurred, based on a comparison between the optical transmission power reported by the transmission source apparatus in response to the instruction and the initial value of the optical transmission power.

In a case that the wavelength demultiplexer is a filter having flat-top transmittance (for example, the dielectric multilayer film filter 4a), the supervisory controller may repeatedly transmit a wavelength adjustment instruction to transit the wavelength to be used by the optical transmitter for transmission of an optical signal, toward the long wavelength side and the short wavelength side within a predetermined range. The supervisory controller determines that a wavelength shift has occurred in the optical transmitter, when the difference between the optical received power of the optical signal received by the optical receiver after the transmission of the wavelength adjustment instruction and the reference value is equal to or greater than the threshold.

The present invention has been described above with reference to the embodiments, but the present invention is not limited to the above-described embodiments. Various changes understood by a person skilled in the art within the scope of the present invention can be made to the configurations and details of the present invention. Furthermore, the embodiments can be performed in any combination within a range where no inconsistency occurs.

INDUSTRIAL APPLICABILITY

The present invention is applicable to an optical communication system that performs wavelength-multiplexed communication.

REFERENCE SIGNS LIST 1, 1a Optical access system
2, 2a OLT
3 ONU
21 Optical transmitter
22 Optical receiver
23, 23a Supervisory controller
24 Control signal superimposing unit
25 Control signal extracting unit
31 Optical receiver
32 Optical transmitter
33 Supervisory controller
34 Control signal extracting unit
35 Control signal superimposing unit
4 AWG filter
4a Dielectric multilayer film filter
5 Optical power splitter
6, 7 Optical fiber

The invention claimed is:

1. An optical communication apparatus comprising:
one or more optical receivers configured to receive optical signals of different wavelengths obtained by a wavelength demultiplexer, the wavelength demultiplexer configured to demultiplex a wavelength-multiplexed signal addressed to the optical communication apparatus; and
a supervisory controller configured to transmit, to a transmission source apparatus, a wavelength adjustment instruction to transit a wavelength to be used by an optical transmitter for transmission of an optical signal, and to set a difference between an optical received power and a reference value of the optical received power within a threshold,
wherein the transmission source apparatus is another optical communication apparatus which is a transmission source of the optical signal, wherein the optical received power is a power of the optical signal received by any of the optical receivers, wherein the supervisory controller is configured to (i) receive a report of an optical transmission power in the optical transmitter from the transmission source apparatus and (ii) detect an abnormality of the optical transmitter, based on a comparison between the optical transmission power thus reported and an initial value of the optical transmission power in the optical transmitter, and wherein, in a case of determining that the difference between the optical received power of the optical signal received by the optical receiver and the reference value is equal to or greater than the threshold, the supervisory controller is configured to:

instruct the transmission source apparatus to report the optical transmission power in the optical transmitter, determine that an abnormality of the optical transmitter has occurred, based on the optical transmission power reported from the transmission source apparatus in response to the instruction being decreased from the initial value by a predetermined value or more, and determine that a wavelength shift has occurred in the optical transmitter, based on a decrease from the initial value being within the predetermined value.

2. The optical communication apparatus according to claim 1, wherein:

the wavelength demultiplexer is a filter with a Gaussian transmittance, and the supervisory controller is configured to transmit the wavelength adjustment instruction to the transmission source apparatus based on the difference between the optical received power of the optical signal received by the optical receiver and the reference value being equal to or greater than the threshold, and transmit, to the transmission source apparatus, a wavelength adjustment instruction to transit a wavelength, with reference to a direction of a wavelength shift determined based on a comparison between optical received powers before and after the wavelength adjustment instruction is transmitted.

3. An optical communication apparatus comprising:

one or more optical receivers configured to receive optical signals of different wavelengths obtained by a wavelength demultiplexer, the wavelength demultiplexer configured to demultiplex a wavelength-multiplexed signal addressed to the optical communication apparatus; and a supervisory controller configured to transmit, to a transmission source apparatus, a wavelength adjustment instruction to transit a wavelength to be used by an optical transmitter for transmission of an optical signal, and to set a difference between an optical received power and a reference value of the optical received power within a threshold, wherein the transmission source apparatus is another optical communication apparatus which is a transmission source of the optical signal, wherein the optical received power is a power of the optical signal received by any of the optical receivers, wherein the supervisory controller is configured to (i) receive a report of an optical transmission power in the optical transmitter from the transmission source apparatus and (ii) detect an abnormality of the optical transmitter, based on a comparison between the optical transmission power thus reported and an initial value of the optical transmission power in the optical transmitter, and wherein:

the wavelength demultiplexer is a filter with a Gaussian transmittance, and the supervisory controller is configured to:

transmit, to the transmission source apparatus, the wavelength adjustment instruction to transit a wavelength by a certain amount, based on the difference between the optical received power of the optical signal received by the optical receiver and the reference value being equal to or greater than the threshold, instruct the transmission source apparatus to report the optical transmission power in the optical transmitter based on the difference not being within the threshold after the wavelength adjustment instruction is repeatedly transmitted a predetermined number of times, and determine that an abnormality in the optical transmitter or another failure has occurred, based on a comparison between an optical transmission power reported from the transmission source apparatus in response to the instruction and the initial value.

4. The optical communication apparatus according to claim 3, wherein:

the wavelength demultiplexer is a filter with a Gaussian transmittance, and the supervisory controller is configured to transmit the wavelength adjustment instruction to the transmission source apparatus based on the difference between the optical received power of the optical signal received by the optical receiver and the reference value being equal to or greater than the threshold, and transmit, to the transmission source apparatus, a wavelength adjustment instruction to transit a wavelength, with reference to a direction of a wavelength shift determined based on a comparison between optical received powers before and after the wavelength adjustment instruction is transmitted.

5. An optical communication apparatus comprising:

one or more optical receivers configured to receive optical signals of different wavelengths obtained by a wavelength demultiplexer, the wavelength demultiplexer configured to demultiplex a wavelength-multiplexed signal addressed to the optical communication apparatus; and a supervisory controller configured to transmit, to a transmission source apparatus, a wavelength adjustment instruction to transit a wavelength to be used by an optical transmitter for transmission of an optical signal, and to set a difference between an optical received power and a reference value of the optical received power within a threshold, wherein the transmission source apparatus is another optical communication apparatus which is a transmission source of the optical signal, wherein the optical received power is a power of the optical signal received by any of the optical receivers, and wherein:

the wavelength demultiplexer is a filter with a flat-top transmittance, and the supervisory controller is configured to:
repeatedly transmit, to the transmission source apparatus, a wavelength adjustment instruction to transit a wavelength to be used by the optical transmitter for transmission of an optical signal, to a long wavelength side and a short wavelength side within a predetermined range, and
determine that a wavelength shift has occurred in the optical transmitter based on a difference between an optical received power of an optical signal received by the optical receiver after the wavelength adjustment instruction is transmitted and the reference value being equal to or greater than the threshold.

6. A wavelength calibration method performed by an optical communication apparatus, the wavelength calibration method comprising:
receiving, by one or more optical receivers, optical signals of different wavelengths obtained by a wavelength demultiplexer, the wavelength demultiplexer configured to demultiplex a wavelength-multiplexed signal addressed to the optical communication apparatus itself;
transmitting, to a transmission source apparatus, a wavelength adjustment instruction to transit a wavelength to be used by an optical transmitter for transmission of an optical signal, and to set a difference between an optical received power and a reference value of the optical received power within a threshold; and
receiving a report of an optical transmission power in the optical transmitter from the transmission source apparatus and detecting an abnormality of the optical transmitter, based on a comparison between the optical transmission power thus reported and an initial value of the optical transmission power in the optical transmitter,
wherein, in a case of determining that the difference between the optical received power of the optical signal received by the optical receiver and the reference value is equal to or greater than the threshold, the method further includes:
instructing the transmission source apparatus to report the optical transmission power in the optical transmitter,
determining that an abnormality of the optical transmitter has occurred, based on the optical transmission power reported from the transmission source apparatus in response to the wavelength adjustment instruction being decreased from the initial value by a predetermined value or more, and
determining that a wavelength shift has occurred in the optical transmitter, based on a decrease from the initial value being within the predetermined value,
wherein the transmission source apparatus is another optical communication apparatus which is a transmission source of the optical signal, and
wherein the optical received power is a power of the optical signal received by any of the optical receivers.

7. A non-transitory computer readable medium which stores a program for causing a computer to be used for an optical communication apparatus comprising one or more optical receivers configured to receive optical signals of different wavelengths obtained by a wavelength demultiplexer configured to demultiplex a wavelength-multiplexed signal addressed to the optical communication apparatus itself, to perform operations including:
transmitting, to a transmission source apparatus, a wavelength adjustment instruction to transit a wavelength to be used by an optical transmitter for transmission of an optical signal, and to set a difference between an optical received power and a reference value of the optical received power within a threshold; and
receiving a report of an optical transmission power in the optical transmitter from the transmission source apparatus and detecting an abnormality of the optical transmitter, based on a comparison between the optical transmission power thus reported and an initial value of the optical transmission power in the optical transmitter,
wherein, in a case of determining that the difference between the optical received power of the optical signal received by the optical receiver and the reference value is equal to or greater than the threshold, the operations further include:
instructing the transmission source apparatus to report the optical transmission power in the optical transmitter,
determining that an abnormality of the optical transmitter has occurred, based on the optical transmission power reported from the transmission source apparatus in response to the wavelength adjustment instruction being decreased from the initial value by a predetermined value or more, and
determining that a wavelength shift has occurred in the optical transmitter, based on a decrease from the initial value being within the predetermined value,
wherein the transmission source apparatus is another optical communication apparatus which is a transmission source of the optical signal, and
wherein the optical received power is a power of the optical signal received by any of the optical receivers.

8. An optical communication apparatus comprising:
one or more optical receivers configured to receive optical signals of different wavelengths obtained by a wavelength demultiplexer, the wavelength demultiplexer configured to demultiplex a wavelength-multiplexed signal addressed to the optical communication apparatus; and
a supervisory controller configured to transmit, to a transmission source apparatus, a wavelength adjustment instruction to transit a wavelength to be used by an optical transmitter for transmission of an optical signal, and to set a difference between an optical received power and a reference value of the optical received power within a threshold,
wherein the transmission source apparatus is another optical communication apparatus which is a transmission source of the optical signal,
wherein the optical received power is a power of the optical signal received by any of the optical receivers,
wherein:
the wavelength demultiplexer is a filter with a Gaussian transmittance,
the supervisory controller is configured to:
transmit the wavelength adjustment instruction to the transmission source apparatus based on the difference between the optical received power of the optical signal received by the optical receiver and the reference value being equal to or greater than the threshold, and
transmit, to the transmission source apparatus, a wavelength adjustment instruction to transit a wavelength, with reference to a direction of a wavelength shift determined based on a comparison between optical received powers before and after the wavelength adjustment instruction is transmitted, and the reference value or the threshold is changed at different times with the passage of time.

* * * * *